(12) United States Patent
Pashley et al.

(10) Patent No.: US 11,390,543 B2
(45) Date of Patent: Jul. 19, 2022

(54) STERILIZATION METHOD

(71) Applicant: NEWSOUTH INNOVATIONS PTY LIMITED, Sydney (AU)

(72) Inventors: Richard Mark Pashley, Cook (AU); Adrian Garrido Sanchis, Giralang (AU); Barry Ninham, Cook (AU)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 23 days.

(21) Appl. No.: 16/767,450

(22) PCT Filed: Nov. 28, 2018

(86) PCT No.: PCT/AU2018/051270
§ 371 (c)(1),
(2) Date: May 27, 2020

(87) PCT Pub. No.: WO2019/104383
PCT Pub. Date: Jun. 6, 2019

(65) Prior Publication Data
US 2021/0002155 A1 Jan. 7, 2021

(30) Foreign Application Priority Data
Nov. 28, 2017 (AU) .................. 2017904797

(51) Int. Cl.
*C02F 1/50* (2006.01)
*C02F 1/66* (2006.01)
*C02F 1/68* (2006.01)

(52) U.S. Cl.
CPC ............... *C02F 1/68* (2013.01); *C02F 1/50* (2013.01); *C02F 1/66* (2013.01); *C02F 2209/06* (2013.01);
(Continued)

(58) Field of Classification Search
CPC ...... C02F 1/68; C02F 1/50; C02F 1/66; C02F 2209/06; C02F 2209/245; C02F 2303/04;
(Continued)

(56) References Cited

U.S. PATENT DOCUMENTS 5,240,598 A * 8/1993 Portier .................. C02F 3/20
210/205
5,882,588 A 3/1999 Laberge
(Continued)

FOREIGN PATENT DOCUMENTS

JP H07289220 A 11/1995
JP 2012 019729 A 2/2012
(Continued)

OTHER PUBLICATIONS

A. Siswanto et al., "Investigation of Bubble Size Distributions in Oscillatory Flow at Various Flow Rates", University of Sheffield, Published in USES Conf. Proc. 01 (2014) (Year: 2014).*
(Continued)

*Primary Examiner* — Joseph W Drodge
(74) *Attorney, Agent, or Firm* — Ballard Spahr LLP

(57) ABSTRACT

This disclosure relates to a method, system and apparatus for inactivating microorganisms in an aqueous solution. The method comprises passing bubbles of a gas through the aqueous solution, wherein the gas comprises at least 10% $CO_2$ by volume and has a temperature of at least 18° C. The system comprises a gas supply to supply gas comprising at least 10% $CO_2$ and having a temperature above 18° C., a gas-delivery apparatus to receive the gas and deliver it into the aqueous solution in the form of bubbles. The apparatus comprises a gas-permeable material having a flow surface configured to enable the flow of the aqueous solution across the flow surface, a chamber arranged at an opposite side of the gas-permeable material to supply a gas that inactivates
(Continued)

microorganisms such that the gas is able to pass through the gas-permeable material and into the aqueous solution as gas bubbles.

12 Claims, 7 Drawing Sheets

(52) U.S. Cl.
CPC .... *C02F 2209/245* (2013.01); *C02F 2303/04* (2013.01); *C02F 2307/14* (2013.01)

(58) Field of Classification Search
CPC .... C02F 2307/14; C02F 1/02; C02F 2305/04; C02F 2303/12; C02F 1/04; C02F 1/10; C02F 1/685; C02F 2209/24; Y02W 10/37; F28D 2021/0042; F28C 3/06; A23L 3/3409; A23L 3/00; A23L 3/003; A23L 3/34095; A23L 3/3418; A23L 3/358; C12M 37/00
See application file for complete search history.

(56) References Cited

U.S. PATENT DOCUMENTS

| | | | |
|---|---|---|---|
| 6,540,922 B1* | 4/2003 | Cordemans | A61K 41/13 210/764 |
| 6,821,481 B1* | 11/2004 | Osajima | C02F 1/50 210/764 |
| 7,255,332 B2* | 8/2007 | Osborn | C02F 1/78 261/28 |
| 2002/0022669 A1* | 2/2002 | To | A63H 33/28 516/98 |
| 2002/0139755 A1* | 10/2002 | Green | C02F 1/78 210/205 |
| 2004/0069611 A1 | 4/2004 | MacGregor | |
| 2004/0074252 A1* | 4/2004 | Shelton | C02F 1/78 62/318 |
| 2005/0084581 A1* | 4/2005 | Sato | A23L 2/54 426/521 |
| 2005/0244546 A1* | 11/2005 | Steffen | B65D 81/2076 426/106 |
| 2005/0260309 A1 | 11/2005 | Hagemeyer et al. | |
| 2006/0270036 A1* | 11/2006 | Goodwin | C12M 27/04 435/395 |
| 2008/0118396 A1* | 5/2008 | De Meulenaer | C02F 1/36 422/128 |
| 2010/0203206 A1 | 8/2010 | Hayata et al. | |
| 2010/0279373 A1* | 11/2010 | Cordemans de Meulenaer | A61L 2/0094 435/173.1 |
| 2015/0239759 A1* | 8/2015 | Kang | C02F 1/72 210/192 |
| 2019/0059420 A1* | 2/2019 | Larsen | A61L 2/035 |
| 2019/0083945 A1* | 3/2019 | Zhang | B01F 23/23123 |

FOREIGN PATENT DOCUMENTS

| | | |
|---|---|---|
| WO | WO 2009/103112 | 8/2009 |
| WO | WO-2016/187674 A1 | 12/2016 |

OTHER PUBLICATIONS

Supplemental European Search Report issued in European Patent Application No. 18884353.6 dated Jun. 24, 2021 (9 pages).
International Search Report and Written Opinion dated Jan. 22, 2019 by the International Searching Authority for International Application No. PCT/AU2018/051270, filed on Nov. 28, 2018 and published as WO 2019/104383 on Jun. 6, 2019 (Applicant-Newsouth Innovations Pty Limited)(14 Pages).

* cited by examiner

STERILIZATION METHOD

This application is a U.S. National Phase Application of International Application No. PCT/AU2018/051270, filed Nov. 28, 2018, which claims priority to AU 2017904797, filed Nov. 28, 2017, all of which applications are hereby incorporated by reference in their entireties.

TECHNICAL FIELD

The present invention relates to a method, system and apparatus for inactivating microorganisms in an aqueous solution. The method, system or apparatus may be used to sterilize an aqueous solution.

BACKGROUND

The inactivation of microorganisms, such as viruses and bacteria, in aqueous solutions can be desirable in many circumstances. For example, microorganisms present in water used in food or pharmaceutical manufacture can cause contamination of the food or pharmaceutical and the water may therefore need to be treated to inactivate the microorganisms prior to its use. Similarly, waste water from agricultural or industrial uses, or water obtained from environmental flows, may contain pathogenic microorganisms which need to be inactivated prior to the water being used for industrial or agricultural purposes or used for drinking water.

Waste water from human activities usually contains human enteric viruses like hepatitis and rotavirus and bacteria like *E. coli*. If this water is to be reused, for example in agriculture, it has to be disinfected.

Various methods are known for inactivating viruses, bacteria and other microorganisms in water and aqueous solutions. Such methods include heat, treatment with chemicals (e.g. ozone), irradiation (e.g. ultraviolet treatment), high-pressure treatment and filtration (e.g. membrane filtration). Many of these methods, especially, heat treatment, are energy intensive. More energy efficient treatment technologies are desperately needed.

The World Health Organisation (WHO) in their guidelines for drinking-water quality compared thermal inactivation rates for different types of bacteria and viruses in hot liquids. They concluded that temperatures above 60° C. effectively inactivate both viruses and bacteria. When the temperature range lies between 60° C. and 65° C., bacterial inactivation occurs faster than viral inactivation. These studies showed that at 60° C. water temperature *E. coli* needs 300 seconds to reach a 1.5 log reduction compared with 1800 seconds for viruses like enterovirus, echovirus 6, coxsackievirus B4 and coxsackievirus B5 to reach 4 log reduction.

It would be desirable to provide alternative methods for inactivating viruses, bacteria or other microorganisms in aqueous solutions. It would be advantageous to provide such methods which do not require the use of high pressures, can be carried out at relatively low cost and/or are not energy intensive.

SUMMARY OF THE INVENTION

In a first aspect, the present invention provides a method for inactivating a microorganism in an aqueous solution, the method comprising:
 passing bubbles of a gas through the aqueous solution, wherein the gas comprises at least 10% $CO_2$ by volume and has a temperature of at least 18° C. when the gas first contacts the aqueous solution.

In one embodiment, the microorganism is algae, protozoa, fungi or a spore. In one embodiment, the microorganism is a virus or bacteria. In one embodiment, the aqueous solution comprises a combination of one or more viruses and one or more bacteria, and the method is used to inactivate the viruses and the bacteria in the aqueous solution.

Typically the bubbles are passed through the aqueous solution while the aqueous solution is exposed to atmospheric pressure or about atmospheric pressure. The aqueous solution may, for example, be exposed to a pressure of about 0.9 to 1.5 bar.

In one embodiment, the bubbles have a diameter of 0.1 mm to 7 mm, e.g. 1 mm to 3 mm.

In one embodiment, the gas comprises from 50% to 100% $CO_2$ by volume. In another embodiment, the gas comprises from 10% to 50% $CO_2$ by volume.

In one embodiment, the gas has a temperature in excess of 100° C. In another embodiment, the gas has a temperature from 18° C. to 100° C.

In one embodiment, the bubbles are formed by passing the gas through a porous material in contact with the aqueous solution, thereby forming bubbles on the surface of the material in contact with the aqueous solution.

In one embodiment, the gas bubbles occupy from 10% to 60% of the total volume of the combination of the aqueous solution and the bubbles as the bubbles pass through the aqueous solution.

In one embodiment, the bulk temperature of the aqueous solution is from 18° C. to 80° C., e.g. from 18° C. to 55° C. or from 18° C. to 50° C.

In one embodiment, the aqueous solution has a bulk temperature of from 18° C. to 55° C., and the gas has a temperature higher than the bulk temperature of the aqueous solution.

In one embodiment, the aqueous solution comprises a bubble coalescence inhibitor. The bubble coalescence inhibitor may, for example, be selected from the group consisting of NaCl, sucrose, emulsifiers and surfactants.

In a second aspect, the present invention provides a system for inactivating microorganisms present in an aqueous solution, the system comprising:
 a gas supply configured to supply gas comprising at least 10% $CO_2$ by volume, the gas having a temperature of above at least 18° C.;
 a gas-delivery apparatus, the gas-delivery apparatus configured to receive the supply of gas and to deliver the gas into the aqueous solution in the form of bubbles.

In a third aspect, the present invention provides an apparatus for inactivating microorganisms present in an aqueous solution, the apparatus comprising:
 a gas-permeable material, the material having a flow surface at one side thereof that is configured to enable the flow of the aqueous solution across the flow surface,
 a chamber arranged at an opposite side of the gas-permeable material to supply a gas that inactivates the microorganisms present in the aqueous solution such that the gas is able to pass through the gas-permeable material and into the aqueous solution flowing across the flow surface as gas bubbles.

BRIEF DESCRIPTION OF THE FIGURES

The invention will be further described, by way of example only, with reference to the accompanying drawings, in which.

DESCRIPTION OF THE INVENTION

Figure 1:
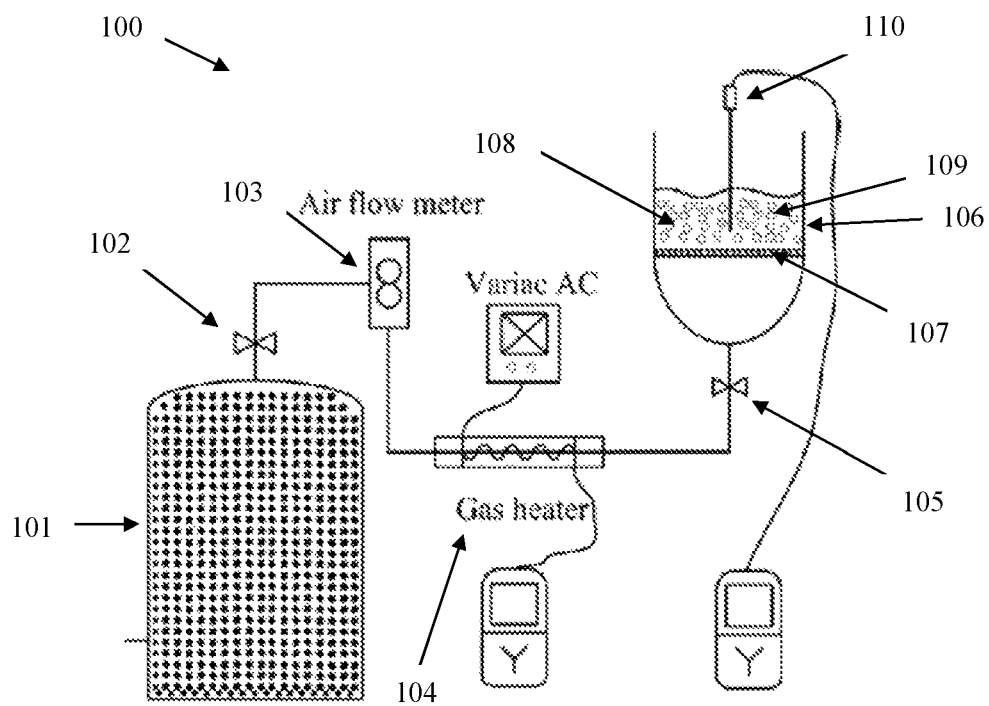
FIG. 1 is a schematic diagram of the system/apparatus used in the Examples to assess the effects of passing the gases $N_2$, $CO_2$, Ar, air and $O_2$ at different temperatures through an aqueous solution in a bubble column evaporator. The gas was pumped through a heater (an electrical heater) that maintained the gas temperature just above the sinter surface at a particular temperature, depending on the experiment. In the Examples described herein, the base of the bubble column evaporator was fitted with a 40-100 μm pore size glass sinter (type 2) of 135 mm diameter. Thermocouples were used to measure the temperature of the gas in the gas heater and the temperature of the aqueous solution in the bubble column evaporator.

In a first aspect, the present invention provides a method for inactivating a microorganism in an aqueous solution, the method comprising:
 passing bubbles of a gas through the aqueous solution, wherein the gas comprises at least 10% $CO_2$ by volume and has a temperature of at least 18° C. when the gas first contacts the aqueous solution.

This method (sometimes referred to herein as the "method of the present invention") is able to inactivate waterborne viruses and bacteria in an aqueous solution without the need for boiling the aqueous solution or raising the bulk temperature of the aqueous solution to a temperature in excess of about 60° C.

As used herein, "inactivating a microorganism" refers to inhibiting or reducing the viability of the microorganism or reducing the number of the microorganisms present in the aqueous solution. Typically, the inactivation of the microorganism kills the microorganism such that the microorganism is no longer viable.

The bubbles of the gas may be passed through the aqueous solution in a bubble column evaporator.

Bubble column evaporators (BCE) are typically cylindrical containers where a gas introduced via a porous frit at the bottom of the column generates a continuous flow of rising bubbles in a liquid phase [1]. They are used in many biochemical, chemical and petrochemical industries [2]. In the waste water industry they are used as reactors for chlorination, oxidation and fermentation [3].

BCEs have several advantages over other systems for contacting a gas and a liquid. BCEs provide for high levels of contact for chemical reactions between gases and liquids, and good heat and mass transfer between the gas and the liquid [1]. If bubble coalescence inhibition can be induced to control bubble size, these advantages improve with enhanced effective interfacial area. The bubbles of many gases coalesce as the bubbles pass through an aqueous solution. The use of a range of strong electrolytes in a BCE inhibits this bubble coalescence and allows the production of high density bubbles (1-3 mm diameter) [4]. Inhibition of bubble coalescence by specific salts at and above physiological concentrations (0.17 M) is a phenomenon much studied since 1993 [4]. It has so far defied explanation. Bubbles do not generally coalesce at concentrations greater than 0.17 M of NaCl, while bubbles of virtually all gases coalesce below that concentration (see reference [4] for detailed results). Added salt at 0.17 M NaCl inhibits bubble coalescence and will increase the performance of the BCE by producing a higher gas-water interfacial area [4]. In the experiments reported in the Examples all the studies were carried out in 0.17 M NaCl solutions, which provided for a similar degree of bubble coalescence for the various gases used.

The inactivation of fecal coliforms using a BCE has recently been described by Xue et al [8]. In the process described in that document, the fecal coliforms were inactivated using hot bubbles (at 150° C.) of air and nitrogen. The BCE process was used to inactivate coliforms in solution while maintaining a relatively low column solution temperature.

In at least preferred embodiments, the method of the present invention, using a gas comprising at least 10% carbon dioxide by volume, provides unexpected advantages over the process described in Xue et al. For example, in some embodiments the bubbles of a gas comprising at least 10% carbon dioxide by volume are effective in inactivating microorganisms, including viruses and bacteria, in an aqueous solution, even when the gas has a temperature well below 150° C., and even at room temperature (about 22° C.). The use of a gas comprising at least 10% carbon dioxide by volume therefore provides an alternative mechanism for inactivating microorganisms which is separate to the thermal inactivation described in Xue et al. As a result, less heating of the gas may be required using such embodiments of the method of the present invention. Further, in some embodiments the bubbles of a gas comprising at least 10% carbon dioxide by volume exhibit less coalescence in aqueous solutions than bubbles of air and many other gases, even in the absence of a bubble coalescence inhibitor. Accordingly, in some embodiments it is not necessary to include a bubble coalescence inhibitor in the aqueous solution to inhibit coalescence of the bubbles. In contrast, when using bubbles of other gases, such as air or nitrogen, in a bubble column evaporator, a bubble coalescence inhibitor generally needs to be included in the aqueous solution to inhibit coalescence of the gas bubbles.

When used as a supercritical fluid or at high pressures, carbon dioxide has previously been successfully used for bacterial and viral inactivation. Other studies have compared the inactivation rates of baker's yeast (*Saccharomyces cerevisiae*) when using an explosive decompression system with $CO_2$, $N_2$, $N_2O$ and Ar under different conditions of high pressure and temperature. These studies found that $CO_2$ and $N_2O$ achieved higher inactivation rates than the other gases. This was attributed to their solubility in water and consequent absorption by the cells [17]. In contrast to the processes used in these studies [14-17], the present invention is effective in inactivating microorganisms without requiring the use of high pressure. Without wishing to be bound by theory, it is believed that the effectiveness of the method of the present invention is due, at least in part, to the large $CO_2$-liquid contact surface produced by passing the bubbles through the aqueous solution. This increases the amount of carbon dioxide dissolved in the solution producing a similar result to that achieved by raising the pressure in dense phase carbon dioxide processes even though, in an aqueous solution exposed to atmospheric pressure, the pressure remains around 1 atm.

The Aqueous Solution

The term "aqueous solution" refers to a liquid in which water is the only solvent or is at least 50% by weight of the total solvents in the liquid. An aqueous solution may be part of an emulsion or microemulsion, such as the aqueous component of an oil/water emulsion or microemulsion. An aqueous solution may comprise water and a water-miscible co-solvent, such as methanol or ethanol, provided that water comprises at least 50% by weight of the solvents present. In some embodiments, water comprises at least 80%, e.g. 80% to 100%, 90% to 100%, 98% to 100%, 99% to 100%, 80% to 99% or 90% to 99%, by weight of the solvents in the aqueous solution.

The aqueous solution, may, for example, be water containing microorganisms which is to be treated to provide drinking water. For example, the present invention can be used to treat water from an environmental flow, such as a river or lake, containing potentially pathogenic microorganisms to reduce the number of the microorganisms to a sufficiently low level that the water is suitable for use as drinking water for humans or suitable for agricultural use.

In some embodiments, the aqueous solution is wastewater from agricultural use containing viruses, bacteria and/or other microorganisms, and the water is treated to inactivate the viruses, bacteria and/or other microorganisms prior to re-use of the water for further agricultural use or prior to release of the water into the environment.

In other embodiments, the aqueous solution may be culture medium from a fermentation or bioreactor containing bacteria used for the production of proteins. One problem with conventional fermentation processes using bacteria to produce proteins is how to both stop the growth of the bacteria and extract the desired proteins. The extraction of the desired proteins can be difficult in some circumstances, for example, for fully or partially hydrophobic proteins which tend to "clump" together inside the cells held together by "hydrophobic forces". In some previous methods, the proteins are separated and extracted using single chained cationic surfactants that destroy cell membranes by detergency. Thereafter the cationic surfactants coat the hydrophobic proteins, and separate the clumps into the individual molecular units required, by electrostatic repulsion between them, now charged by their cationic surfactant coating. However, the surfactant then needs to be removed from the protein, e.g. by passing the surfactant and protein through an ion exchange column, which can be expensive. The method of the present invention provides an alternative way to kill the bacteria. Further, in the case of hydrophobic proteins, degassing the system can be used to separate the hydrophobic proteins.

Water has a high heat of evaporation. The heat of evaporation (also referred to as the enthalpy of vaporization or the heat of vaporization) is the enthalpy change required to transform a given quantity of a substance from a liquid into a gas at a given pressure. For a liquid having a high heat of evaporation, more heat is required to vaporize a given quantity of the liquid than a liquid having a lower heat of evaporation. Because of the high heat of evaporation of water, the passing of the gas, especially when the gas used has low humidity, through the aqueous solution will generally cause less heating of the bulk liquid (as a result of the vapour captured by the gas bubbles) compared to a liquid having a lower heat of evaporation.

In some embodiments, the bulk temperature of the aqueous solution while the bubbles of the gas are passed through the aqueous solution is from 18° C. to 80° C., e.g. from 18° C. to 60° C., from 18° C. to 55° C., from 18° C. to 50° C., from 20° C. to 80° C., from 20° C. to 60° C., from 20° C. to 55° C. or from 20° C. to 50° C. The bulk temperature of a liquid is the temperature of the liquid away from a surface, e.g. the surface of a container containing the liquid or the surface of a bubble passing through the liquid. In the method of the present invention, the bulk temperature of the aqueous solution can be determined by measuring the temperature of the aqueous solution at a point away from a surface. As the bubbles passing through the aqueous solution in the method of the present invention cause rapid mixing of the aqueous solution, the bulk temperature of the aqueous solution can generally be determined by a single measurement of the temperature of the aqueous solution using a conventional thermometer or other apparatus for measuring the temperature of a liquid. A person skilled in the art will be able to select an appropriate method for determining the bulk temperature of the aqueous solution taking into account such factors as, for example, the method used to pass the bubbles through the aqueous solution and the vessel used to contain the aqueous solution etc.

In some embodiments, the bulk temperature of the aqueous solution prior to passing the bubbles of the gas through the aqueous solution is from 10° C. to 80° C., e.g. from 10° C. to 30° C., from 10° C. to 50° C., from 18° C. to 80° C., from 18° C. to 60° C., from 18° C. to 55° C. or from 18° C. to 50° C. In some embodiments, the bulk temperature of the aqueous solution may change (increase or decrease depending on the particular gas or gas mixture, and the relative temperatures of the gas and the aqueous solution) as the bubbles of the gas are passed through the aqueous solution.

A bubble coalescence inhibitor may be included in the aqueous solution. Accordingly, in some embodiments the aqueous solution comprises a bubble coalescence inhibitor. In some embodiments, the method comprises a step, prior to the step of passing the bubbles of the gas through the aqueous solution, of adding a bubble coalescence inhibitor to the aqueous solution. In other embodiments, the aqueous solution does not contain a bubble coalescence inhibitor, does not contain an added bubble coalescence inhibitor, or does not contain a significant amount of a bubble coalescence inhibitor or added bubble coalescence inhibitor.

As used herein, the term "bubble coalescence inhibitor" refers to any substance which, when present in an aqueous solution above a certain concentration, inhibits gas bubbles in the aqueous solution from coalescing. A person skilled in the art can readily determine whether a substance is a bubble coalescence inhibitor. For example, a person skilled in the art can determine whether a substance is a bubble coalescence inhibitor by adding the substance at different concentrations to samples of an aqueous solution and visually observing the effect of the substance on the coalescence of bubbles, e.g. bubbles of air, passed through the aqueous solution. Examples of bubble coalescence inhibitors include certain salts e.g. $MgCl_2$, $MgSO_4$, NaCl, NaBr, $NaNO_3$, $Na_2SO_4$, $CaCl_2$, $Ca(NO_3)_2$, KCl, KBr, $KNO_3$, $NH_4Br$, $NH_4NO_3$, CsBr, LiCl, $LiNO_3$, $LiSO_4$, and various sugars, e.g. sucrose. Other bubble coalescence inhibitors include emulsifiers and surfactants. In some embodiments, the aqueous solution is or comprises wastewater, which may already contain one or more bubble coalescence inhibitors. In some embodiments, the wastewater contains lipids, surfactants and/or biopolymers.

Bubbles of a gas comprising at least 10% carbon dioxide by volume exhibit less coalescence in an aqueous solution than bubbles of air, nitrogen and many other gases. Accordingly, in the method of the present invention it is not essential to include a bubble coalescence inhibitor in the aqueous solution. However, in some embodiments, a bubble coalescence inhibitor may be added to the aqueous solution to inhibit coalescence of the gas bubbles. In such embodiments, the bubble coalescence inhibitor is typically included in the aqueous solution in an amount effective to inhibit bubbles of the gas from coalescing in the aqueous solution.

In some embodiments, the bubble coalescence inhibitor is a surfactant or an emulsifier. The surfactant may, for example, be a non-ionic surfactant, a cationic surfactant, an anionic surfactant (e.g. common soap), or a zwitterionic surfactant. Non-ionic surfactants include monododecyl octaethylene glycol. Cationic surfactants include cetylpyridinium chloride. Anionic surfactants include sodium dodecyl sulphate. Examples of emulsifiers include lipids, proteins and fats which act as an emulsifier.

Some polymers also act as emulsifiers, such as, for example, sodium carboxymethyl cellulose, methyl cellulose and polyoxyethylene stearate.

The Gas Bubbles

The method of the present invention comprises passing bubbles of gas through an aqueous solution. The gas comprises at least 10% by volume carbon dioxide. Accordingly, the gas comprises from 10% to 100% by volume carbon dioxide.

As a person skilled in the art will appreciate, the relative amounts of components of the gas in the bubbles may change as the bubbles pass through the aqueous solution. For example, when the gas comprises a mixture of gases, one or more of the gases may more readily dissolve in the aqueous solution than the other gases. As a further example, as the bubbles pass through the aqueous solution, water or other components of the aqueous solution may be vaporised and incorporated into the gas in the gas bubbles. Unless specified otherwise, a reference herein to the amount of a component of the gas (e.g. the percentage by volume of $CO_2$ in the gas), is a reference to the amount of the component in the gas when the gas is first contacted with aqueous solution to form bubbles in the aqueous solution. The gas as first contacted with the aqueous solution is sometimes referred to herein as the inlet gas.

As a person skilled in the art will also appreciate, the temperature of the gas in the bubbles may change as the bubbles pass through the aqueous solution. Unless specified otherwise, a reference herein to the temperature of the gas is a reference to the temperature of the gas when the gas is first contacted with aqueous solution, that is, the inlet gas temperature.

In some embodiments, the gas comprises from 50% to 100%, e.g. from 80% to 99%, by volume carbon dioxide.

In some embodiments, the gas comprises from 10% to 98%, e.g. 10% to 90%, 10% to 80%, 10% to 50%, or 10% to 20%, by volume carbon dioxide. In some embodiments, the gas comprises from 15% to 100%, or from 20% to 100%, by volume carbon dioxide.

Carbon dioxide, being a greenhouse gas is considered to have some responsibility for global warming. Many industries like landfills, bio-gas plants and coal power plants, emit large amounts of $CO_2$. The present invention advantageously provides a method for the use of $CO_2$-containing gases produced by such industries.

The temperature of the gas when the gas first contacts the aqueous solution is at least 18° C.

In some embodiments, the temperature of the gas when the gas first contacts the aqueous solution is higher than the bulk temperature of the aqueous solution. In some embodiments, the aqueous solution has a bulk temperature of from 18° C. to 55° C., and the gas has a temperature higher than the bulk temperature of the aqueous solution.

In some embodiments, the temperature of the gas is at least 50° C., e.g. at least 55° C., at least 60° C. or at least 100° C. In some embodiments, the temperature of the gas is from 50° C. to 1000° C., 50° C. to 500° C., 50° C. to 400° C., 50° C. to 300° C., 50° C. to 200° C., 50° C. to 150° C., 55° C. to 1000° C., 55° C. to 500° C., 55° C. to 400° C., 55° C. to 300° C., 55° C. to 200° C., 55° C. to 150° C., 60° C. to 1000° C., 60° C. to 500° C., 60° C. to 400° C., 60° C. to 300° C., 60° C. to 200° C. or 60° C. to 150° C. In some embodiments, the temperature of the gas is at least 100° C., e.g. from 100° C. to 1000° C., 100° C. to 500° C., 100° C. to 400° C., 100° C. to 300° C., 100° C. to 200° C., 150° C. to 1000° C., 150° C. to 500° C., 150° C. to 400° C., 150° C. to 300° C., 150° C. to 200° C., or 100° C. to 150° C.

When bubbles of a gas having a temperature that is higher than the bulk temperature of the aqueous solution are introduced and passed through the aqueous solution, a transient hot surface layer may be produced around each bubble. For example, when bubbles of a gas having a temperature in excess of 100° C. are introduced and passed through an aqueous solution having a bulk temperature of below 100° C., a transient hot surface layer is produced around each bubble. This transient hot surface layer has a higher temperature than the bulk temperature of the aqueous solution. Without wishing to be bound by theory, it is believed that, when the gas has a temperature of 100° C. or more, the interaction of the microorganism with this transient hot surface layer and the heated gas bubbles themselves results in inactivation of the microorganism, even when the bulk temperature of the aqueous solution is below a temperature that will inactivate the microorganism.

As the gas bubbles pass through the aqueous solution, the transient hot surface layer causes vaporisation of some of the aqueous solution which is picked up by the gas bubble. This results in cooling of the gas bubble as it passes through the aqueous solution and, as the gas bubble passes through the aqueous solution, the temperature and extent of the transient hot surface layer diminishes. The extent to which the gas bubbles can pick up the vaporised aqueous solution therefore affects the extent to which the gas increases the bulk temperature of the aqueous solution as the bubbles pass through the aqueous solution. When the gas has low humidity, greater vaporisation of the aqueous solution can occur resulting in more thermal energy being used for vaporization than will occur when the gas has a higher initial water content. As a result of the vaporisation of some of the aqueous solution as the gas bubbles pass through the aqueous solution, the gas bubbles can be passed through the aqueous solution without substantially increasing the bulk temperature of the aqueous solution. The present invention therefore provides a method which can be used to inactive microorganisms in an aqueous solution that does not require heating the bulk solution to a temperature effective to inactivate the microorganism.

In some embodiments, the gas when first contacted with the aqueous solution (i.e. the inlet gas) has a relatively low humidity. In some embodiments, the relative humidity of the gas is less than 50%, e.g. less than 40%, less than 25%, less than 20% or less than 10%. A gas having a relatively low humidity can more readily absorb water vapour from the aqueous solution and will therefore result in less heating of the bulk liquid than a gas having a relatively high humidity.

In some embodiments, the aqueous solution comprises a surfactant or emulsifier. As mentioned above, surfactants may act as a bubble coalescence inhibitor. The presence of a surfactant or emulsifier in the aqueous solution may also increase the rate of inactivation of the microorganisms, especially when the inlet gas has a temperature in excess of 100° C. The surfactant or emulsifier forms a coating around the bubbles. Due to the presence of the surfactant or emulsifier in the surface layer of the bubbles, the boiling point of the surface layer of the bubbles is higher than the surface layer surrounding bubbles formed in the absence of a surfactant or emulsifier. As a result, the transient hot surface layer of the bubbles can reach higher temperatures than in bubbles formed in the absence of a surfactant or emulsifier. Exposure of the microorganism to transient hot surface layers having a higher temperature may increase the rate of inactivation of the microorganism.

Surprisingly, when the temperature of the gas is below 100° C., e.g. from about 22° C. to 50° C., the method of the present invention may still be effective in inactivating one or more microorganisms in an aqueous solution. Without wishing to be bound by theory, it is believed that this is due to the large $CO_2$-liquid contact surface produced by passing the bubbles through the aqueous solution. This increases the amount of carbon dioxide dissolved in the solution presumably producing a similar effect to what can be achieved by raising the pressure in dense phase carbon dioxide processes, even though, when the method of the present invention is carried out in an aqueous solution exposed to atmospheric pressure, the pressure remains around 1 atm. Accordingly, in some embodiments, the temperature of the gas is below about 100° C., e.g. from 18° C. to 100° C. or from 22° C. to 100° C. In some embodiments, the temperature of the gas is from 18° C. to 50° C. or from 22° C. to 50° C.

In some embodiments, the inlet gas may be a combustion gas formed by the combustion of a fuel comprising carbon, such as the combustion of methane, natural gas, petroleum, coal, coke, charcoal, wood, bio-gas, biomass or ethanol, in air or another atmosphere comprising oxygen. In some embodiments, the combustion gas is the exhaust of an internal combustion engine. The combustion gas formed by the combustion in air of a fuel containing carbon comprises a mixture of gases. The gases formed by the combustion in air of a fuel containing carbon comprise carbon dioxide and other combustion products as well as nitrogen and argon (from the air). The other combustion products typically include water, as well as small amounts of other gases such as CO, $H_2$, $SO_2$ and nitrogen oxides.

The combustion gas may be used in the method of the present invention without further processing. Advantageously, the combustion gas may be used immediately after the combustion while the gas has an elevated temperature from the combustion process.

The use of a combustion gas in the method of the present invention provides several advantages. Firstly, the method of the present invention provides a use for the combustion gas which would otherwise have typically been treated as a waste product. The combustion gas may have an elevated temperature which may contribute to the inactivation of the microorganisms as the bubbles pass through the aqueous solution. Further, the trace gases, such as CO, $H_2$, $SO_2$ and nitrogen oxides, present in the combustion gas may themselves have biocidal actions contributing to the inactivation of microorganisms in the aqueous solution. Further, the presence of water vapour in combustion gases reduces the bubble column evaporative cooling effect, allowing the combustion gas to heat the aqueous solution to a greater extent than another gas having a lower amount of water vapour.

When the aqueous solution is exposed to atmospheric pressure, the gas bubbles may, for example, be introduced into the aqueous solution using a gas inlet having a pressure in the range of just above atmospheric pressure, e.g. in the range 1 to 1.5 atm.

In some embodiments, the bubbles are formed by passing the gas through a porous material, e.g. a porous glass sinter, in contact with the aqueous solution, thereby forming bubbles on the surface of the material in contact with the aqueous solution. As more gas is passed through the porous material, bubbles are released from the surface of the material and rise through the aqueous solution. Advantageously, the temperature of the gas may be regulated before it contacts the porous material, thereby providing a means to control the temperature of the gas as it contacts the aqueous solution. In some embodiments, the porous material is a sintered material (e.g. glass sinter, glass frit or metal sinter such as a stainless-steel sinter) or a porous ceramic (e.g. fireclay ceramic). In some embodiments, the porous material has a pore size in the range of from 1 to 1000 μm (e.g. from 10 to 500 μm, from 20 to 200 μm, from 40 to 100 μm, from 50 to 80 μm), especially from 40 to 100 μm. As will be appreciated, a person skilled in the art may manipulate the size of the bubbles by varying various parameters, such as the pore size of the porous material, viscosity of aqueous solution, surface tension of aqueous solution, gas flow rate and/or gas pressure.

Typically, the bubbles of the gas are passed through the aqueous solution by passing the gas through a porous material at the base of a vessel or structure containing the aqueous solution to form bubbles of the gas which then rise through the aqueous solution.

Accordingly, in some embodiments, the present invention provides a method for inactivating a microorganism in an aqueous solution, the method comprising:

passing a gas through a porous material in contact with the aqueous solution to form bubbles of the gas in the aqueous solution, and allowing the bubbles to rise through the aqueous solution, wherein the gas comprises at least 10% $CO_2$ by volume and has a temperature of at least 18° C. when the gas first contacts the aqueous solution.

In some embodiments, the method is performed in a bubble column evaporator (sometimes referred to as a bubble column reactor). Bubble column reactors typically consist of one or more vertically arranged cylindrical columns. Bubble columns are configured such that gas, in the form of bubbles, is introduced to a lower portion of the column and rises through the liquid phase. The gas escaping from the top surface of the liquid phase may be recaptured. The recaptured gas may be recycled back to the bubble column reactor, reheated and reintroduced back to the bottom of the column.

Preferably, the bubbles have a diameter of 0.1 mm to 7 mm, e.g. 0.1 mm to 7 mm, 0.1 mm to 6 mm, 0.1 mm to 5 mm, 0.1 mm to 4 mm, 0.1 mm to 3 mm, 0.1 mm to 2 mm, 0.1 mm to 1 mm, 0.5 mm to 7 mm, 0.5 mm to 6 mm, 0.5 mm to 5 mm, 0.5 mm to 4 mm, 0.5 mm to 3 mm, 0.5 mm to 2 mm, 0.5 mm to 1 mm, 1 mm to 7 mm, 1 mm to 6 mm, 1 mm to 5 mm, 1 mm to 4 mm, 1 mm to 3 mm, 1 mm to 2 mm, 2 mm to 7 mm, 2 mm to 6 mm, 2 mm to 5 mm, 2 mm to 4 mm or 2 mm to 3 mm. The bubbles are preferably passed through the aqueous solution in a high density. Typically, the aqueous solution becomes opaque as a result of the passage of the high density of bubbles. In some embodiments, the gas bubbles occupy from 10 to 60% (e.g. from 20 to 60%, from 30 to 60%, from 40 to 60%, from 50 to 60%, from 10 to 50%, from 20 to 50%, from 25% to 55%, from 30 to 50%, from 40 to 50%, from 10 to 40%, from 20 to 40%, from 30 to 40%, from 10 to 30%, from 20 to 30% or from 10 to 20%) of the total volume of the combination of the aqueous solution and the gas bubbles as the bubbles pass through the aqueous solution.

When using a BCE exposed to atmospheric pressure, the gas bubbles have a pressure in the column of typically about 1 atm plus the hydrostatic pressure of the liquid in the column. As they leave the column their pressure will fall to 1 atm. Dry gas bubbles entering the base of the column will rapidly absorb the vapour density of water corresponding to the temperature of the liquid in the column.

The bubbles may, for example, be passed through the aqueous solution in either a continuous or an intermittent manner. Preferably, the bubbles are passed through the aqueous solution in a continuous stream. In such embodiments, the gas bubbles typically occupy from 10 to 60% of the total volume of the combination of the aqueous solution and the gas bubbles, as the bubbles pass through the aqueous solution.

In some embodiments, the bubbles are passed through the aqueous solution in a continuous stream for a period of time in excess of about 30 seconds, e.g. for a period of time in excess of about 1 minute. In some embodiments, the bubbles are passed through the aqueous solution in a continuous stream for a period of from 30 seconds to 90 minutes, from 1 minute to 90 minutes, from 1 minute to 30 minutes, from 1 minute to 10 minutes, from 2 minutes to 30 minutes or from 5 minutes to 30 minutes.

In some embodiments, the bubbles are passed through the aqueous solution at a rate of greater than 0.1 litre of gas per litre of aqueous solution per minute, for example, from 0.1 to 1000, 1 to 1000, 10 to 1000 or 10 to 100 litres of gas per litre of aqueous solution per minute.

In a second aspect, the present invention provides a system for inactivating microorganisms present in an aqueous solution, the system comprising:

a gas supply configured to supply gas comprising at least 10% $CO_2$ by volume, the gas having a temperature of above at least 18° C.;

a gas-delivery apparatus, the gas-delivery apparatus configured to receive the supply of gas and to deliver the gas into the aqueous solution in the form of bubbles.

Features described in relation to the first aspect may also apply to the second aspect.

In some particular embodiments, the gas-delivery apparatus is a bubble column evaporator or bubble column reactor. In some particular embodiments, the gas-delivery apparatus is an array of bubble column evaporators or bubble column reactors. In some particular embodiments, the array comprises from 2 to 200 BCEs, e.g. 5 to 100 BCEs.

In some particular embodiments, the gas supply comprises a heater to heat a gas source or an inlet gas to thereby form the gas having a temperature of above at least 18° C.

In some particular embodiments the gas supply further comprises a gas source. The gas source may be adapted to provide the gas that comprises at least 10% $CO_2$ by volume.

In some particular embodiments, the gas source can be a commercially available product, for example, $CO_2$ in a pressurised cylinder (e.g. as available from BOC Gas Australia). In some particular embodiments, the $CO_2$ can be mixed with one or more other gases (e.g. $N_2$, $O_2$, Ar) to obtain the desired proportion (e.g. by volume or partial pressure) of $CO_2$. In some embodiments, the $CO_2$ can be generated on site, for example, by chemical reaction, including combustion. In some particular embodiments, the gas source is a combustion gas formed by the combustion of a fuel comprising carbon, especially fuel combusted in an internal combustion engine.

FIG. 1 is a schematic diagram depicting an embodiment of a system in accordance with the second aspect of the present invention. The system 100 includes a gas supply comprising a gas source 101 (which provides a gas comprising at least 10% $CO_2$ by volume) in fluid connection with a first tap 102, an air flow meter 103, a gas heater 104, and a second tap 105. The heater 104 may be used to ensure that the temperature of the gas reaching the gas-delivery apparatus is greater than about 18° C. In some embodiments, the heater 104 is used to heat the gas to a desired temperature. The gas supply is configured to supply gas to the gas-delivery apparatus. In this embodiment, the gas-delivery apparatus comprises a bubble column evaporator 106 which itself comprises a porous material in the form of a glass sinter 107 and a portion configured to hold a liquid. In use, the bubble column evaporator 106 contains the aqueous solution comprising a microorganism 108. The gas-delivery apparatus delivers the heated gas into the aqueous solution 108 via the glass sinter 107. When gas is delivered into the solution 108, it forms bubbles 109 of said gas, which rise through the solution 108, thereby inactivating microorganisms present in said solution 108. This embodiment also includes a thermocouple 110 used to measure the temperature of the bulk solution 108.

In a third aspect, the present invention provides an apparatus for inactivating microorganisms present in an aqueous solution, the apparatus comprising:

a gas-permeable material, the material having a flow surface at one side thereof that is configured to enable the flow of the aqueous solution across the flow surface, a chamber arranged at an opposite side of the gas-permeable material to supply a gas that inactivates the microorganisms present in the aqueous solution such that the gas is able to pass through the gas-permeable material and into the aqueous solution flowing across the flow surface as gas bubbles.

Features described in relation to the first aspect may also apply to the third aspect.

Typically, the gas that inactivates the microorganisms present in the aqueous solution is a gas comprising at least 10% $CO_2$ by volume and having a temperature of at least 18° C.

In some particular embodiments, the flow of the aqueous solution is effected by gravity. In some particular embodiments, the flow of the aqueous solution is effected by a pump.

In some particular embodiments, the apparatus comprises a heating element positioned to heat the gas prior to contacting the gas-permeable material. In some particular embodiments, the heating element is disposed in the chamber. In some particular embodiments, the heating element is disposed in or near an inlet into the chamber to heat the incoming gas as it enters the chamber. In some particular embodiments, the chamber walls are heated. In some particular embodiments, a heat exchanger is used to heat the incoming gas.

In some particular embodiments, the flow surface is in the form of a channel. In some particular embodiments, the flow surface is a portion of a conduit or pipe. In some particular embodiments, the flow across the flow surface involves the flow of the aqueous solution from a first region of the surface to a second region of the surface.

In some particular embodiments, the flow surface is configured such that gas bubbles pass through the aqueous solution in a direction transverse to the direction of flow of the aqueous solution as it flows across the flow surface. In some particular embodiments, the gas bubbles ascend in the aqueous solution whilst the aqueous solution flows in a substantially horizontal direction (e.g. from about 0° to about 20°, from about 0° to about 10°, or from about 0° to about 5°).

In some particular embodiments, the gas-permeable material is selected such that the gas bubbles passing into the aqueous solution have a diameter of from about 0.1 mm to about 7 mm when the aqueous solution is under about 0.9 to 1.5 bar of pressure. As a person skilled in the art will appreciate, this may be achieved by the selection of a gas-permeable material having an appropriate porosity, operating at a particular pressure or pressure range.

In some particular embodiments, the apparatus comprises a cover arranged so as to capture the gas as it exits the aqueous solution.

Figure 9:
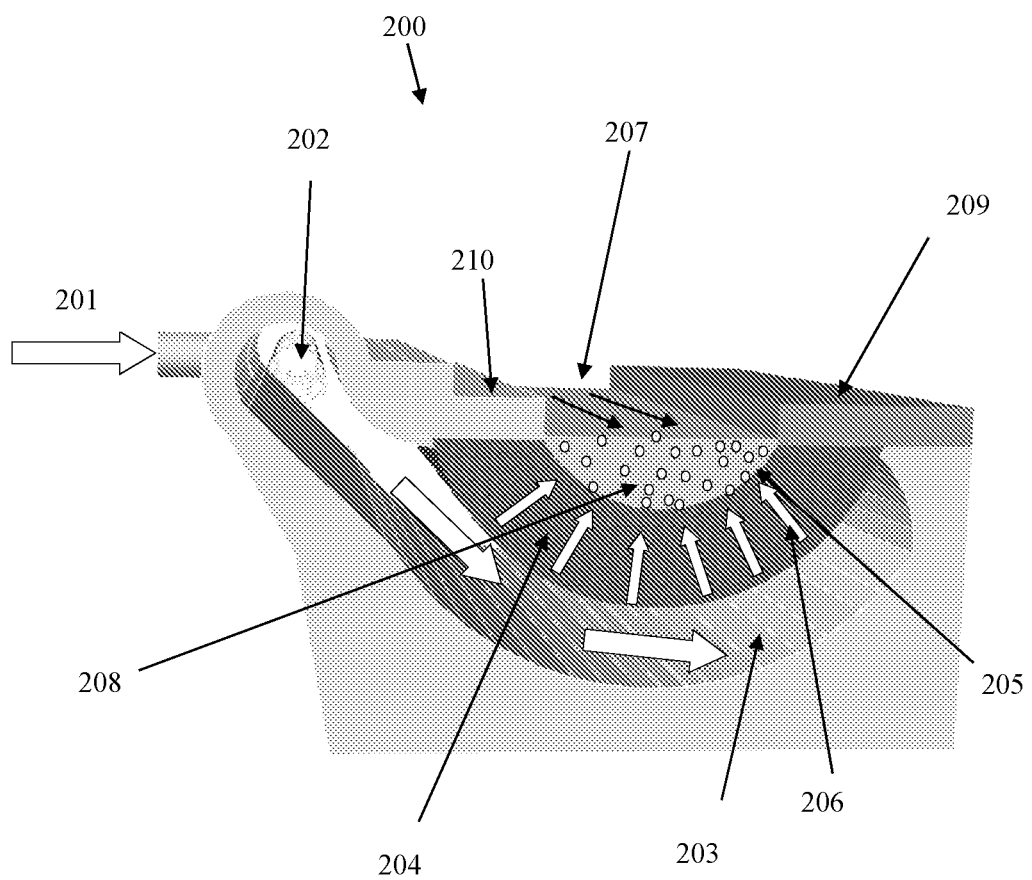
FIG. 9 is a perspective view of a cross-section of a continuous flow reactor (an embodiment of the third aspect) for performing the method of the present invention in a continuous manner as an aqueous solution flows through the flow reactor.

The method of the present invention can be carried out in a continuous manner as the aqueous solution flows between two positions (e.g. as the aqueous solution moves through a channel), for example, using an apparatus of the third aspect. FIG. 9 is a perspective view of a cross-section of a continuous flow reactor, which may be used for performing the method of the present invention as an aqueous solution moves through the flow reactor. As shown generally in FIG. 9, the gas (e.g. $CO_2$ gas or combustion gas) is introduced through the inlet to a chamber. Optionally, a heater in the chamber is used to heat the gas. The gas then flows through a porous structure, e.g. formed of a porous ceramic, such as fireclay ceramic, to a channel in the porous structure through which the aqueous solution is flowing. Bubbles of the gas then rise through the aqueous solution, inactivating microorganisms in the aqueous solution as the aqueous solution moves along the channel.

In more detail, FIG. 9 is schematic diagram depicting an embodiment of an apparatus in accordance with the third aspect of the present invention. The apparatus 200 comprises an inlet 201 for receiving a gas comprising at least 10% $CO_2$ by volume. The gas passes a heater 202 as it flows into a chamber 203. In alternative embodiments, the chamber 203 itself could be heated. In use, the chamber 203 becomes filled with the heated gas. The heated gas is urged, under positive pressure, through the gas-permeable material, in the form of a fireclay ceramic 204 (a porous material; movement of gas indicated by arrows 206) via the flow surface 205 and into the aqueous solution 207. In this embodiment, the flow surface is in the form of a channel. The gas rises from the flow surface 205 in the form of heated bubbles 208 which ascend through the aqueous solution. The aqueous solution 207 flows across the flow surface in a substantially horizontal direction under the action of gravity, whilst the bubbles 208 rise generally vertically though the aqueous solution 207, emerging on the surface of the solution. In some embodiments, the emerging gas is captured by a cover placed over the top of the aqueous solution, optionally forming a seal against the non-porous support structure 209 and 210 holding the porous material 204 (which may form part of the chamber). In some embodiments the support structure 209 is detachable.

Microorganism

Typically the microorganism is a bacteria, e.g. *E. coli*, or a virus. However, the method of the present invention can also be used to inactivate other microorganisms, such as algae, protozoa, fungi or spores.

In some embodiments, the microorganism is a bacteria selected from *E. coli, Clostridium botulinum, Campylobacter jejuni, Vibrio cholera, Vibrio vulnificus, Vibrio alginolyticus, Vibrio parahaemolyticus, Mycobacterium marinum*, a species which causes dysentery such as *Shigella dysenteriae*, a species of the genus *Legionella* such as *Legionella pneumophila*, a species of the genus *Leptospira*, or *Salmonella typhi*.

In some embodiments, the microorganism is a virus selected from Coronavirus, Hepatitis A virus, Poliovirus, or a Polyomavirus.

In some embodiments, the microorganism is a protozoan, such as *Cryptosporidium parvum* or another pathogenic protozoan.

In some embodiments, the microorganism inactivation in the aqueous solution is at least 1 log reduction, for example, from 1 to 4 log reduction, from 1 to 3 log reduction, from 1 to 2 log reduction, from 1 to 1.5 log reduction, from 1.5 to 4 log reduction, from 1.5 to 3 log reduction, from 1.5 to 2 log reduction, from 2 to 4 log reduction, from 2 to 3 log reduction). Said reductions are relative to the initial microorganism content in the initial solution (i.e. before contact with gas). In some particular embodiments, said microorganism inactivation is achieved in under 90 minutes, for example, from 30 seconds to 90 minutes, from 30 seconds to 90 minutes, from 30 seconds to 30 minutes, from 30 seconds to 10 minutes, from 30 seconds to 5 minutes, from 1 minute to 90 minutes, from 1 minute to 30 minutes, from 1 minute to 10 minutes, from 1 minute to 5 minutes, from 2 minutes to 30 minutes or from 5 minutes to 30 minutes.

EXAMPLES

Various embodiments of the present invention are described below with reference to the following, non-limiting, Examples.

Model Water Treatment Viruses and Bacterial Systems

MS2 Virus

MS2 bacteriophage (ATCC 15597-B1) [12, 13] was chosen as the model virus to evaluate the efficiency of methods of inactivation of viruses. MS2 is usually quantified by counting infectious units via a standard plaque assay that is commonly used for detection of MS2 in treated drinking water and waste-water [20].

MS2 is used as a surrogate for enteric viruses since it is inactivated only at temperatures above 60° C., is resistant to high salinity and susceptible only to low pH. This means that it is highly resistant to environmental stress [21].

According to [22] MS2 is a bacteriophage member of class called group I. Its entire genome has been sequenced. It is a positive-sense, single-stranded RNA molecule of 3,569 nucleotides and it has an icosahedral structure. The virus has a hydrodynamic radius of about 13 nm [22].

Analysis of virus inactivation was carried out using the optimized Double Layer Plaque Assay technique described in Cormier et al [23], that detects only infectious viruses by using $E.\ coli$ as their host.

Coliform Bacteria $Escherichia\ coli$ is a gram negative bacteria with a straight cylindrical rod shape of 1.1-1.5 μm diameter and 2.0-6.0 μm length [24]. It is found in the gastrointestinal tract of animals and humans. $E.\ coli$ strains can be harmless or pathogenic to the host. As the result of fecal contamination they can be found in water and soil. Therefore its presence in water has often been used as an indicator to monitor water quality [25].

Figure 2:
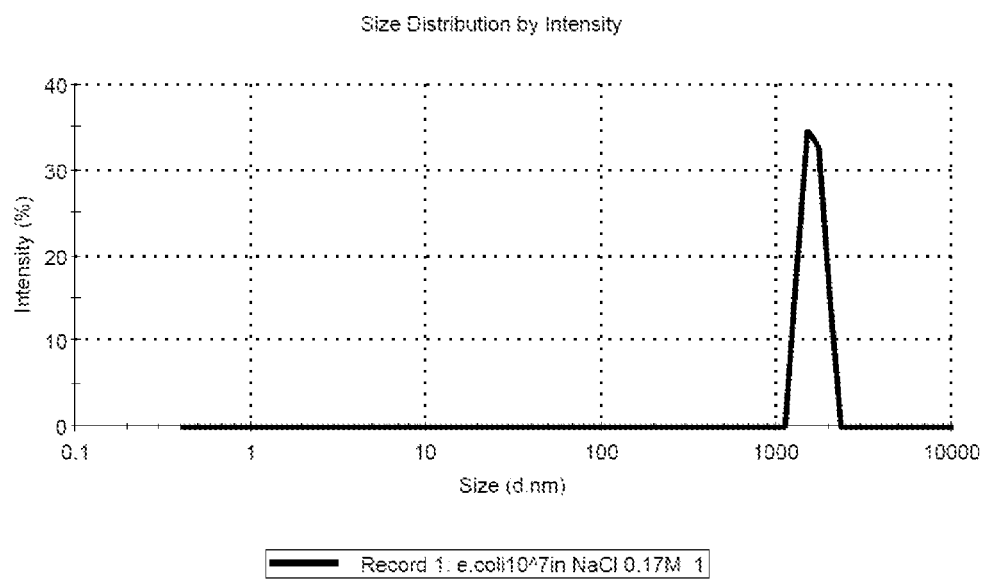
FIG. 2 is a graph of *E. coli* size distribution for *E. coli* ATCC 15597 for $1 \times 10^6$ cell/ml in 0.17 M NaCl using DLS at 25° C. (peak (mean/area) at 1601 d.nm).
Figure 3:
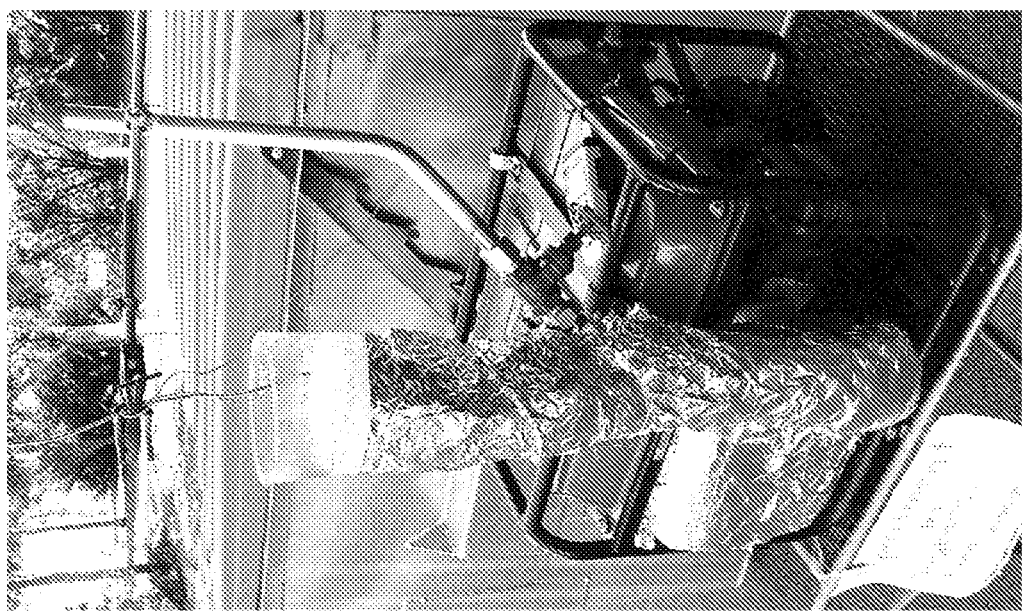
FIG. 3 is a photograph of the apparatus used in the Examples in which combustion gas was used as the gas. The photograph shows the exhaust pipe of a generator (Honda EM2200) attached to a valve that provides an exhaust gas flow of 27 l/min through a bubble column evaporator.

Many studies use $Escherichia\ coli$ C-3000 (ATCC15597) as a representative model for bacteria in water [26, 27]. $Escherichia\ coli$ C-3000 (ATCC15597) is a biosafety level 1 organism [11] and can be used as MS2 virus host [28]. That is why it has been selected for this work. Size distributions for $E.\ coli$ strain (ATCC 15597) were measured in 0.17 M NaCl background solution, and obtained a peak size at 1600 nm (the results are shown in FIG. 2). This value fits within the literature measurements of 1100-1500 nm diameter and 2000-6000 nm length [24] for a cylindrical rod shape.

Spinks et al. [29] demonstrated that pathogenic bacteria are inactivated in a temperature range of 55° to 65° C. Other studies found that $E.\ coli$ presents the first thermal inactivation signs at temperatures over 55° C., achieving high inactivation rates at 60° C. [30]. This is expected as the membrane phospholipids have a phase transition and lose their ordered state at this temperature.

MATERIAL AND METHODS

Experimental Solutions

An electrolyte solution was prepared and sterilized by autoclaving in an Aesculap 420 at 15 psi, and 121-124° C. for 15 minutes [31].

Typically, the solution used comprised 0.17 M NaCl (≥99% purity, obtained from Sigma-Aldrich) in 300 ml of Milli-Q water.

Tabor et al [32] found that bubble coalescence in water depends on gas type and pH. In Tabor et al it was observed that $CO_2$ bubbles do not coalesce, whereas other gases like Ar, $N_2$ and air do. For this reason, 0.17 M NaCl solution was used in the experiments described below to ensure that bubble coalescence was similar for all the gases studied, eliminating a possible confounding variable. In the experiments, NaCl (0.17 M) was used to reduce bubble size and inhibit coalescence, but often wastewater contains lipids, surfactants and biopolymers, which even at low levels can stabilise bubbles and reduce bubble size.

The MS2 virus is resistant to high salinity and is stable in the presence of 1 to 2 M of NaCl [33]. Previous studies [5, 8 and 9] have shown that 0.17 M NaCl solutions do not inactivate $E.\ coli$. So the concentration of NaCl should not be a factor in the inactivation of the virus or bacteria.

Media Preparation for the Virus Experiments

A specific optimized Double Layer Plaque Assay technique as described in Cormier et al [23] was used to assess the concentration of active MS2 viruses. This plaque assay method is commonly used for detection of MS2 in treated drinking water, wastewater and marine water. The water quality is assessed based on the ability of bacteriophages to kill the host bacteria and allow phages to propagate in a confluent lawn of bacterial host cells immobilized in a layer of agar [23, 28, 34, 35].

The medium is not commercially available, so before each experiment 1.5 L was prepared from two solutions (A and B). For the preparation of solution A 15 g. of tryptone, 1.5 g. of yeast extract, 12 g. of NaCl and 1425 ml of Milli-Q water was used. A pH value of 6.9 was measured with a Thermos Scientific Orion Star A214 pH meter. This solution was aseptically dispensed into 3 vessels with different amounts of agar (1% for the bottom agar, 0.5% for the top agar and no agar for the media), the agar used in the experiments was molecular biology-grade from Sigma-Aldrich. These solutions were heated to boiling to dissolve agar and sterilized by autoclaving in an Aesculap 420 at 15 psi, and 121-124° C., for 15 minutes.

Solution B improved the visibility of the viruses. This solution was prepared by adding 1.5 g. of glucose, 0.441 g. of $CaCl_2$ and 0.015 g. of thiamine to 75 ml of Milli-Q water and filtered through a 0.22 μm filter for its sterilisation and then was aseptically added to each of the 3 solutions A, once they cooled to 50° C.

The bottom agar was poured into 100 mm×15 mm petri dishes and dried around the Bunsen burner, to maintain local environmental sterility, until the agar was not too dry or too moist [34].

Media Preparation for the $E.\ coli$ Experiments

The plaque assay method is commonly used for detection of $E.\ coli$ in treated drinking water, wastewater and marine water. The water quality is assessed based on the ability of bacteria to propagate in a layer of agar [26, 34].

For each experiment 1 L was prepared from two solutions (A and B). For the preparation of solution A 13 g. of tryptone, 1 g. of yeast extract, 6 g. of NaCl and 1000 ml of Milli-Q water was used. A pH value of 6.9 was measured with a Thermos Scientific Orion Star A214 pH meter. This solution was aseptically dispensed into 2 vessels with different amounts of agar (1.41% agar and no agar for the media), the agar used in the experiments was molecular biology-grade from Sigma-Aldrich. These solutions were heated to boiling to dissolve agar and sterilized by autoclaving in an Aesculap 420 at 15 psi, and 121-124° C., for 15 minutes.

Solution B improved the growth of bacteria. This solution was prepared by adding 1 g. of glucose and 0.010 g. of thiamine to 50 ml of Milli-Q water and filtered through a 0.22 μm filter for its sterilisation and then was aseptically added to each of the 2 solutions A, once they cooled to 50° C.

The 1.41% agar solution was poured into 100 mm×15 mm petri dishes and dried around a Bunsen burner, to maintain local environmental sterility, until the agar was not too dry or too moist [34].

Bacterial Strain

*Escherichia coli* C-3000 (ATCC15597) was used as a representative model for bacterias in water [26, 27] for the *E. coli* inactivation experiments and also for the virus experiments as MS2 virus host [28]. The size and the zeta-potential of the *E. coli* was measured in 0.17 M NaCl solution with different gas bubbles using a Malvern Zetasizer nano series instrument.

For a successful plaque assay, the *Escherichia coli* C-3000 (ATCC 15597) must be in the exponential phase of growth. This was achieved by growing two separate bacterial cultures: an overnight culture and the log phase culture [28, 31, 35]. The overnight culture was grown in 10 ml of the media without agar at 37° C. for 18-20 hours in a Labtech digital incubator, model LIB-030M, while shaking at 110 rpm with a PSU-10i orbital shaker. The overnight culture resulted in high numbers of bacteria in the culture and this was used as reference standard.

To start the log phase *E. coli* culture, 1 ml of the overnight culture was transferred in to 25-30 ml of broth without agar and incubated for 3 h at 37° C., with gentle shaking at 110 rpm. To prevent loss of F-pill by the cells they were then quickly cooled in a refrigerator, at 5° C. A UV-VIS spectrometer, UVmini-1240, was then used to measure the optical density (OD) of the log phase *E. coli* culture. OD readings at 520 nm of between 0.8 and 1.1 indicated that the culture can be used in the plaque assay for the virus experiments and as a standard for the *E. coli* experiments.

Viral Strain

A freeze-dried vial of MS2 bacteriophage was acquired from the American Type Culture Collection. Bacteriophage MS2 (ATCC 15597-B1) was replicated using *Escherichia coli* C-3000 (ATCC 15597) according to the International Standard ISO 10705-1 [31] and the Ultraviolet disinfection guidance manual of the United States Environmental Protection Agency [36]. The zeta-potential of the MS2 viruses in 0.17 M NaCl solution with different gas bubbles was measured using a Malvern Zetasizer nano series instrument.

Viral and Bacterial Dilutions

The concentration of the MS2 bacteriophage and *E. coli* was calculated by adding 1.0 ml of medium without agar to the vial and serially 10-fold diluted 12 times by passing 0.50 ml of the bacteriophage and the *E. coli* (in a separate experiment) into tubes containing 4.50 ml of medium without agar [35]. 0.1 ml of dilutions from $10^{-6}$ to $10^{-12}$ were spotted on the surface of 14 petri dishes and spread with a hockey stick.

After overnight incubation, 18-24 hours at 37° C., individual plaques were countable and the concentration of the MS2 Bacteriophage and *E. coli* was calculated using the equation:

$$\text{Undiluted spiking suspension in PFU/mL} = (PFU1 + PFU2 \ldots PFUn)/(V1+V2 \ldots Vn)$$

Here PFU is the number of plaque forming units from plates, Vn is the volume (in mL) of each undiluted sample added to the plates containing countable plaques and n is the number of useable counts.

Bubble Column Evaporator Process

FIG. 1 shows a schematic diagram of the system/apparatus used to assess the effects of passing the gases $N_2$, $CO_2$, Ar, air and $O_2$ at different temperatures through an aqueous solution in a bubble column evaporator. The gases were pumped through the electrical heater that maintained the gas temperature just above the sinter surface at the base of the bubble column evaporator at a particular temperature, depending on the experiment. The base of the bubble column evaporator was fitted with a 40-100 μm pore size glass sinter (type 2) of 135 mm diameter.

Once the aqueous solution was poured into the column, the temperature of the solution was measured with a thermocouple in the centre of the column solution. The gas was then passed through the sinter into the 300 ml solution to inactivate MS2 viruses or *E. coli* (in separate experiments).

When using combustion gas, a similar bubble column evaporator to that used in the other experiments was used with the exhaust pipe of a generator (Honda EM2200) attached to a valve that provides an exhaust gas flow of 27 l/min through the bubble column (shown in FIG. 3).

Disinfection Experiments

Experiments were performed using a 0.17 M NaCl solution (initial temperature of 22.5° C.), with inlet gases of $CO_2$, argon, nitrogen, air, oxygen and combustion gas mixtures, at temperatures of 150° C. for $CO_2$, argon, nitrogen, air and oxygen, 58° C. for combustion gas and 20° C. for oxygen and air for the *E. coli* experiments, and 200° C. for $CO_2$, argon, nitrogen, air and oxygen and 60° C. for combustion gas for MS2 virus experiments, in the BCE, and, for comparison, in a water bath at 22.5° C. and pH 4.2. Further experiments were also performed using MS2 virus in a 0.17 M NaCl solution (initial temperature of about 22° C.) in the BCE, with $CO_2$ gas at different inlet temperatures (205° C., 150° C., 100° C., 11° C. and 20° C.) and with $CO_2$ gas having an inlet temperature of 22° C. at different flow rates (27 l/min and 20 l/min).

The enumeration of bacteriophage and *E. coli* viability was performed by the plaque assay method [23, 34, 35].

Once the solutions with known concentration of coliphage and *E. coli* were prepared, experiments were conducted to study the inactivation of the coliphage with different gases and inlet gas temperatures. 1.3 ml samples were collected from 10 to 15 mm above the central area of the sinter every 6 minutes during 36 minutes for the virus experiments and every 2 min for the *E. coli* experiments. 0.07 ml of each sample was spotted in triplicate following the double layer plaque assay technique [36].

To evaluate the effect of solution pH on the inactivation of MS2 bacteriophage and *E. coli* experiments, comparison tests using 0.17 M NaCl solution at pH 4.1, were carried out in a separate beaker, in a water bath. During these experiments, samples were regularly taken out from the beaker and analysed as before.

Data Analysis

Plaque counts were performed for all 18-21 plates of each of the experiments. The mean and the standard deviation of each triplicated sample using a virus or bacteria survival factor: $\text{Log}_{10}(\text{PFU}/\text{PFU}_0)$, where $\text{PFU}_0$ is the initial number of PFU per sample and PFU is the PFU per sample after an exposure time in minutes. When plotted, a second order polynomial distribution was applied to fit the survival curves [21].

Results and Discussion

Some typical results are shown in FIG. 4 which shows photographs of the petri dishes used in the double layer plaque assay technique for MS2 virus inactivation in a NaCl 0.17 M aqueous solution at 200° C. $CO_2$ inlet temperature after (a) 0, (b) 0.75, (c) 2.25 and (d) 3 min of treatment in the BCE. Total inactivation of 295 PFU/plate per sample was achieved in only 3.5 minutes using a total heat input of only 0.02 kJ/ml (the temperature of the solution at the conclusion of the experiment was 46.5° C.).

1. pH Effect on Virus and Bacteria Inactivation When Bubbling $CO_2$ in the Aqueous Solution When using $CO_2$ gas in the bubble column the pH of the water dropped from 5.9 to 4.2 in less than 45 seconds.

When $CO_2$ dissolves in water 99% stays as the dissolved molecular gas and less than 1% as carbonic acid ($H_2CO_3$). This reduces the pH of the water to around 4 (equation 2). Carbonic acid dissociates into bicarbonate ion ($HCO_3^-$) and carbonate ion ($CO_3^{2-}$) (see equations 3 and 4) [37].

$$CO_2(g) \rightarrow CO_2(aq) \quad (1)$$

$$CO_2(aq) + H_2O(l) \leftrightharpoons H_2CO_3(aq) \quad (2)$$

$$H_2CO_3(aq) \leftrightharpoons H^+ + HCO_3^-(aq) \quad (3)$$

$$HCO_3^-(aq) \leftrightharpoons H^+ + CO_3^{2-}(aq) \quad (4)$$

To determine if the reduction in pH, due to dissolved $CO_2$ (equations 1, 2, 3 and 4), was related to its disinfectant effects, two experiments with carbonic acid ($H_2CO_3$) at pH 4.2 were conducted in a continuous stirred beaker, one for viruses and another one for bacteria.

Carbonic acid ($H_2CO_3$) was produced by bubbling 27 l/min. of pure $CO_2$ through the 0.17 M NaCl solution during 10 minutes at 22° C. After bubbling the solution was continuously stirred in the beaker and a sample was taken every 3 minutes, the pH was 4.2 and a log virus reduction of only 0.002 was observed. For *E. coli*, only a 0.08-log removal was observed, which suggests that low pH has a slight inactivation effect on *E. coli* and no effect on viruses. Some authors describe a small, low pH inactivation effect on microbial cells, since membranes stop protons from penetration but low pH makes membrane more permeable to other substances like $CO_2$ due to the chemical modification on the phospholipid bilayer of membranes [38, 39]. Cheng et al [14] observed almost no inactivation change under different pH conditions (pH 4, 4.5, 5 and 5.5) for 3 different viruses (MS2, Qβ and φX174). They believed that H$^+$ ions could not enter the capsid as easily as $CO_2$ molecules.

Therefore, reduced pH was considered not responsible for the high virus and bacterial inactivation effects that were observed when bubbling $CO_2$ into the BCE.

2. Effect of Different Gases on Virus and Bacterial Inactivation

In these experiments, MS2 virus (ATCC 15597-B1) and *E. coli* (ATCC 15597) inactivation rates were determined when bubbling inlet air at 200° C. (for virus) and 150° C. (for *E. coli*) in the bubble column evaporator through 0.17 M NaCl solutions. The same experiments were carried out with different gases present in air (nitrogen, oxygen, $CO_2$ and argon). 99% of air is a mixture of nitrogen and oxygen gases, the other 1% contains argon and $CO_2$ (among others).

Lastly, combustion gases from a generator at about 60° C. were used to inactivate first MS2 viruses and later *E. coli* (the temperature of the combustion gases in the MS2 virus experiments was 60° C. and in the *E. coli* experiments was 58° C.).

Figure 5:
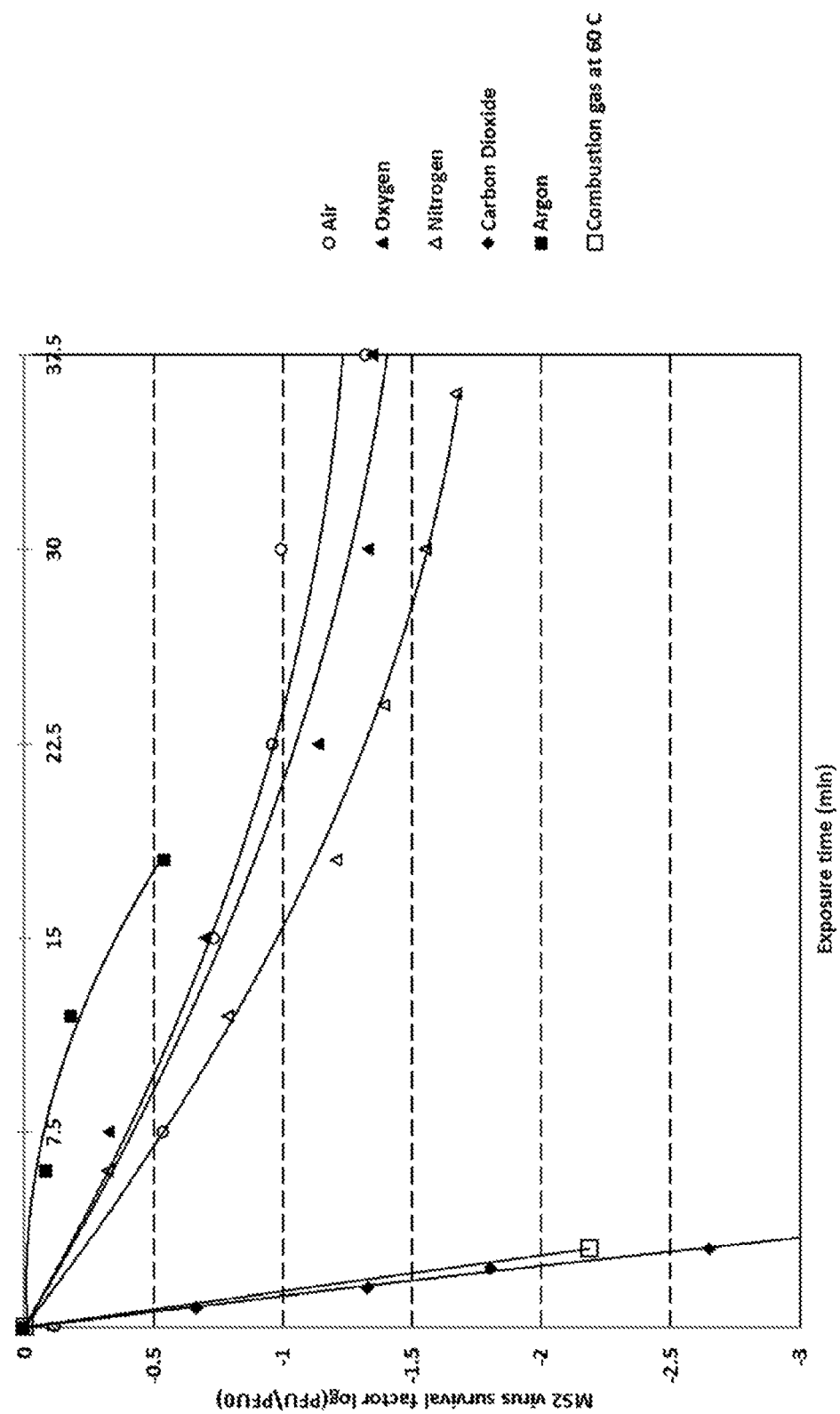
FIG. 5 is a graph of MS2 virus survival factor log (PFU\PFU0) versus exposure time (min) of bubbling different gases (air, oxygen, nitrogen, carbon dioxide or argon at an inlet temperature of 200° C. or combustion gas from a generator at 60° C.) in a 0.17 M NaCl solution.
Figure 6:
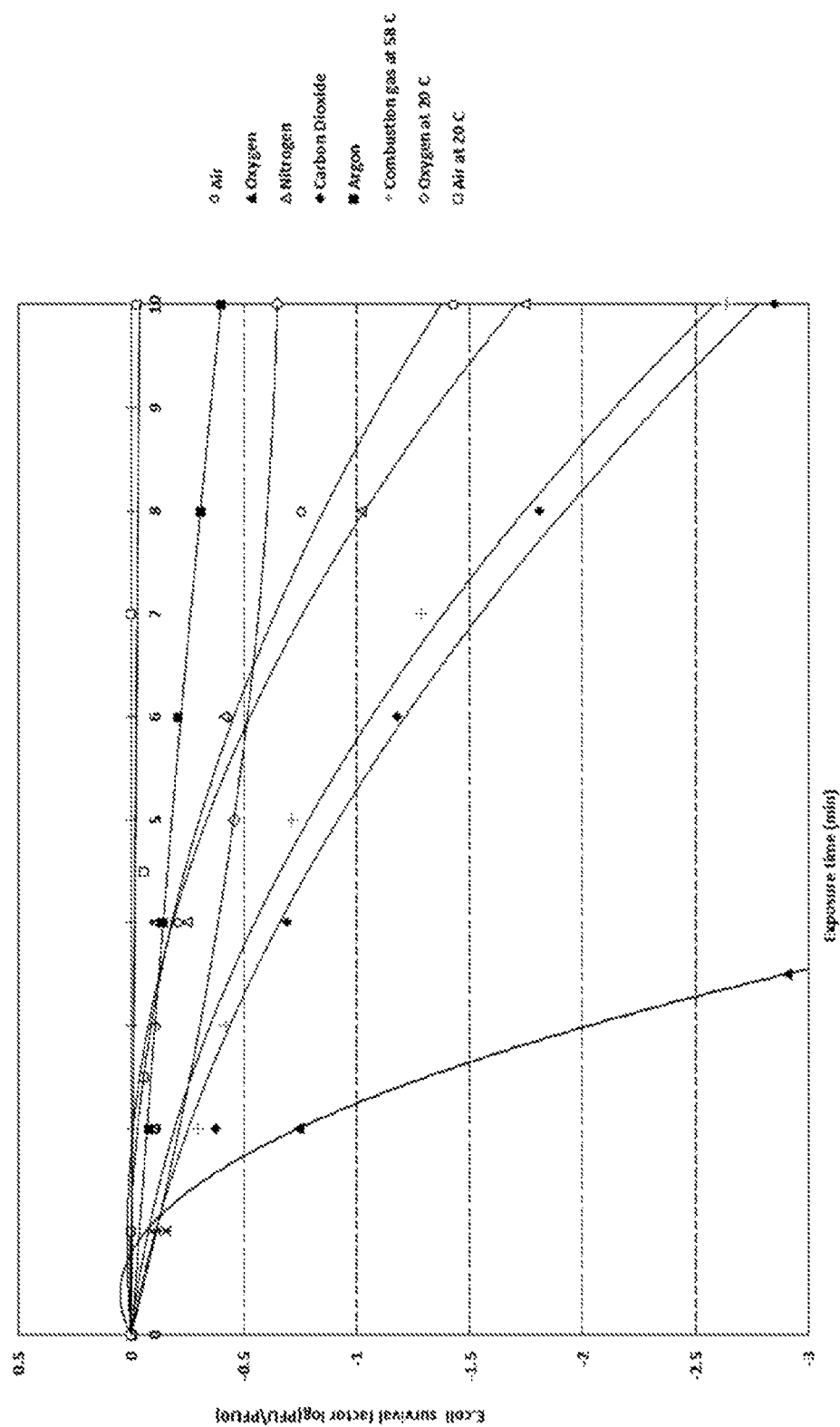
FIG. 6 is a graph of *E. coli* survival factor log(PFU\PFU0) versus exposure time (min) of bubbling different gases (air, oxygen, nitrogen, carbon dioxide or argon at an inlet temperature of 150° C., combustion gas from a generator at 58° C., oxygen at 20° C. or air at 20° C.) in a 0.17 M NaCl solution.

The results of these experiments are shown in FIGS. 5 and 6.

Inactivation rates for MS2 virus with gases at 200° C. were found to be quite similar, except for $CO_2$ and combustion gases. When inactivating *E. coli* with gases at 150° C. oxygen produced the highest inactivation rates, followed by $CO_2$ and combustion gas.

When bubbling $CO_2$, Ar, $N_2$ and air through water in previous studies [32] [17] it was demonstrated that $CO_2$ behaved differently to the rest due to its solubility in water, changes in pH and the zeta potential of its bubbles.

Enomoto et al. [17] found that when using an explosive decomposition system, highly soluble gases in water, like $CO_2$ and $N_2O$, achieved greater inactivation rates of *Saccharomyces cerevisiae* than when using other gases, like Ar or $N_2$, that are less soluble in water. Tabor et al [32] demonstrated that $CO_2$ prevents bubble coalescence much better than the other gases. Bubble coalescence inhibition is a very important variable in the performance of the BCE since it increases the gas/water interfacial area, this is the reason why all the experiments have been conducted in a 0.17 M NaCl solution [4], to ensure that all the gases presented a similar degree of inhibition of bubble coalescence in the column solution.

Carbon dioxide has high water solubility, produces a lower magnitude of coliform and virus Zeta potentials and lower pH values (see Table 1) compared with the rest of the gases used in these experiments.

The solubility at 52° C. (for viruses) and 43° C. (for *E. coli*) of the different gases used were obtained from literature values (http://www.engineeringtoolbox.com). The pH values were measured during the experiments and the Zeta potential values were measured during the experiments at a virus concentration of $10^8$ per ml and *E. coli* concentration of $10^7$ per ml.

TABLE 1

Solubility, microorganism Zeta potential, pH, heat capacity, water temperature at the conclusion of the experiment, thickness of the heated layer around the gas bubble and average temperature of this layer for the gases in the study with viruses and bacteria.

| Gas | Solubility* | Zeta potential values | pH | Cp (Kj/(kg K)) | Water Temperature C. | Heated water Layer Thickness z (nm) | Average Temperature of the Layer. C. |
|---|---|---|---|---|---|---|---|
| *Eschrichia coli* C-3000 (ATCC15597) with gases at 150° C. | | | | | | | |
| Oxygen | 0.030 | −11.8 | 6.1 | 0.92 | 45.2 | 38.6 | 72.6 |
| Nitrogen | 0.014 | −12.2 | 5.7 | 1.04 | 43.4 | 37 | 71.7 |
| Carbon dioxide | 0.950 | −9.4 | 4.0 | 0.84 | 43.3 | 30 | 71.7 |
| Argon | 0.040 | −12.4 | 6.0 | 0.52 | 38.6 | 24.3 | 69.3 |
| Air | 0.017 | −12.5 | 5.7 | 1.01 | 44.7 | 38.1 | 72.4 |
| Combustion Gas | | −9.1 | 4.1 | | 39.5 | | |

TABLE 1-continued

Solubility, microorganism Zeta potential, pH, heat capacity, water temperature at the conclusion of the experiment, thickness of the heated layer around the gas bubble and average temperature of this layer for the gases in the study with viruses and bacteria.

| Gas | Solubility* | Zeta potential values | pH | Cp (Kj/(kg K)) | Water Temperature C. | Heated water Layer Thickness z (nm) | Average Temperature of the Layer. C. |
|---|---|---|---|---|---|---|---|
| MS2 bacteriophage (ATCC 15597-B1) with gases at 200° C. | | | | | | | |
| Oxygen | 0.027 | −12.6 | 6 | 0.92 | 49.5 | 83.8 | 74.8 |
| Nitrogen | 0.013 | −10.8 | 5.6 | 1.04 | 53.7 | 90.5 | 76.9 |
| Carbon dioxide | 0.800 | −6.2 | 4.0 | 0.84 | 46.5 | 99.9 | 73.2 |
| Argon | 0.035 | −12.2 | 6.0 | 0.52 | 46 | 55.3 | 73 |
| Air | 0.016 | −14.3 | 5.8 | 1.01 | 52 | 87.2 | 76 |
| Combustion Gas | | −5.1 | 4.1 | | 30 | | |

*Solubilities of gases in Water at 43° C. for *e. coli* and 52° C. for virus. Grams of as dissolved in 1 Kg of water at 1 atm.

The "water temperature" referred to in Table 1 is the temperature of the aqueous solution at the conclusion of the experiment (for the *E. coli* experiments, this was after 10 minutes for all gases, and for the virus experiments this was after 37.5 minutes for all gases except carbon dioxide gas and combustion gas and after 4 minutes for carbon dioxide gas and combustion gas). For all the experiments, except the virus experiments using carbon dioxide gas or combustion gas, the temperature at the conclusion of the experiment was the equilibrium solution temperature (that is, the temperature remained constant at this temperature as further gas bubbles were passed through the solution). In these experiments, the aqueous solution typically reached the equilibrium solution temperature after about 5 minutes. The average temperature of the heated layer around the gas bubble reported in Table 1 was calculated as discussed below based on the water temperature reported in Table 1.

In Table 1 (virus section) $CO_2$ presents a lower temperature at the conclusion of the experiment, only 46.5° C., than expected from steady state conditions, according to its heat capacity. This is due to the fact that only the average temperature of the water after 4 min. was used, since this was the time needed to achieve total virus inactivation, when using $CO_2$. For the gases oxygen, nitrogen, argon and air the average temperature after 37.5 min was used, as this was the time needed to achieve 1.5 log virus inactivation. For bacteria, the average temperature was obtained after 10 min., which was the time needed to achieve an average of 1.5 log of *E. coli* inactivation.

The temperature and the thickness of the hot water layer around the surface of a 1 mm diameter gas bubble can be roughly estimated for inlet gas temperatures in excess of 100° C. using the formulae (5), (6) and (7) described below.

The temperature of the hot water layer around the surface of a 1 mm diameter gas bubble can be roughly estimated by the formula:

$$T_1 = \frac{100 + T_c}{2} \quad (5)$$

where $T_1$ (in ° C.) is the average (transient) temperature of the hot water layer surrounding the gas bubble and $T_c$ (° C.) is the temperature of the solution in the BCE, assuming that the hot gas bubble cooled from the inlet temperature to 100° C.

The thickness of the transient, heated layer can be estimated by balancing the heat supplied by the cooling bubble with the heat required to raise the film to this average temperature.

Thus, the volume of the film V is given by:

$$V = 4\pi r^2 z \quad (6)$$

where V is the volume of the layer of thickness z around the bubble when r>>z.

The thermal energy balance is therefore given by:

$$C_p \Delta T V = C_{water} \Delta t 4\pi r^2 \rho_w z \quad (7)$$

where $C_p$, $C_{water}$ are the gas and water heat capacities, respectively, $\rho_w$ is the liquid water mass density, $\Delta T$ is the cooling of the air bubble and $\Delta t$ is the transient temperature increase in the water layer.

In practice, we might expect that roughly half of the heat supplied by the cooling bubble will be used in evaporating water into the $CO_2$ bubble and hence the calculated, roughly estimated, film thicknesses will be halved.

Typical results from this calculation are given in Table 1.

3. MS2 Virus Inactivation with Different Gases at 200° C.

Thermal Inactivation Mechanism

When the gas inlet temperature is 200° C., collisions between the transient hot layers around the rising hot gas bubbles and MS2 viruses can inactivate the viruses. The MS2 virus is rapidly inactivated at temperatures above 60° C. [21, 40], so hot gas bubbles will effectively inactivate viruses if the temperature of the hot layer around the bubbles is greater than 60° C. It was previously shown (Garrido et al [7]) that the MS2 virus can be inactivated by heat exchange with hot air bubbles at 150° C. during collisions in the BCE. This mechanism appears to be related to how closely the viruses and the bubbles approach on collision. In the earlier experiments MS2 virus survival factors were tested and correlated with the interaction surface forces between virus and bubbles. The results reported indicate that at 150° C. added electrolytes can control the surface forces between the virus and the hot surface of the bubbles and so influence deactivation rates. MS2 virus survival factors for several different gases at 200° C. and combustion gas at 60° C. were compared using the BCE process and the results are shown in FIG. 5. Air, oxygen, nitrogen and argon with an inlet gas temperature of 200° C. were found to have very similar virus inactivation rates, of between 1.33 and 1.67—log reduction after 37.5 min of treatment. When the hot gas bubbles form on the surface of the sinter, a thin layer of heated water is transiently formed around the surface of the bubbles and this thin layer has a similar average temperature, with values from 73° C. to 76.9° C., and thickness, with values of approximately from 55 to 91 nm, for these 4 gases (see Table 1). Without wishing to be bound by theory, it is believed collisions between the transient hot layers around the rising hot gas bubbles and MS2 viruses is the fundamental mechanism of virus inactivation for these 4 gases.

$CO_2$ Inactivation Mechanism

Figure 4:
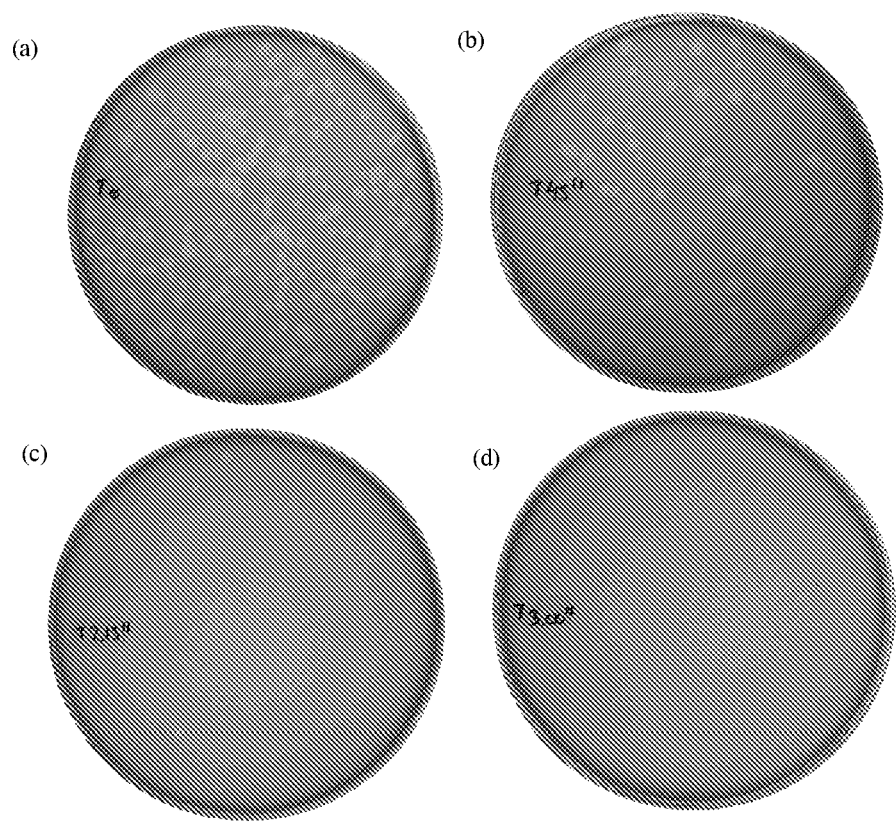
FIG. 4 shows photographs of petri dishes from double layer plaque assays for MS2 virus from samples taken from a NaCl 0.17 M solution in a BCE after (a) 0, (b) 0.75, (c) 2.25 and (d) 3 minutes treatment with $CO_2$ having an inlet temperature of 200° C. as described in the Examples.

By comparison, when $CO_2$ (100% of $CO_2$) and combustion gas (with a 12.5 to 14% of $CO_2$ according to text book 'Combustion Fundamentals' Chapter 2 [41]) at 200° C. and 60° C., respectively, were used in the experiment, the collision between viruses and the hot water layers around the hot $CO_2$ bubbles appears to be not the only mechanism that causes the fast virus inactivation rates, of 2.2 log for combustion gas and 2.7 log for pure $CO_2$, in just 3.5 minutes (see FIGS. 4 and 5), observed in these studies.

When using combustion gas other combustion products than $CO_2$, $H_2O$ and $N_2$ could be present due to minor components and impurities in the fuel and different fuel/air ratio. These gases typically include: carbon monoxide (CO), hydrogen ($H_2$), sulphur oxide ($SO_2$) and mono-nitrogen oxides (NOx) like NO and $NO_2$ [41]. The presence of these gases in very small amounts may explain the similar results obtained when using pure $CO_2$ at 200° C. and the combustion gas was only used at an inlet temperature of 60° C. For example, Richard F. et al [42] investigated the viral inactivation properties of $SO_2$ and its high solubility in water.

Francis et al. [43] studied the latent heat of vaporization in a BCE with different aqueous salt solutions and estimated for a dry nitrogen inlet gas temperature of 60° C., an equilibrium temperature of 22° C. However, combustion gases are saturated with water and therefore heat is not used to evaporate water vapour into the bubbles; this explains why when the combustion gas inlet temperature was only 60° C. the equilibrium temperature of the water stayed high at 39.5° C., rather than 22° C., expected if the gas was dried. Therefore if much of the heat in the hot gas bubbles is not used to evaporate water, the 60° C. inlet gas temperature could also have an inactivation effect on viruses by raising the bulk temperature of the aqueous solution.

When $CO_2$ gas is bubbled through the sinter area a large $CO_2$-liquid contact surface is continually produced. This increases the amount of $CO_2$ dissolved in the solution producing a similar effect to what can be achieved by raising the pressure in dense phase carbon dioxide (DPCD) processes even though in the bubble column the pressure remained around 1 atm. Many authors have proved the inactivation of microorganisms when using pressurized $CO_2$ [14-16]. The mechanism used to explain this inactivation effect is related to its high solubility in water.

Cheng et al [14] propose an inactivation mechanism for bacteriophages MS2 and Qβ based on the penetration of $CO_2$ inside the capsid under high pressure and later expansion when depressurized, so damaging the capsid. $CO_2$-protein binding could also damage the capsid inactivating the virus.

4. *E. coli* (ATCC 15597) inactivation results with gases at 150° C.

Thermal Inactivation Mechanism

When inactivating *E. coli* (ATCC 15597) with air and nitrogen at an inlet temperature of 150° C. in the BCE, similar *E. coli* inactivation results (FIG. 6) were obtained to those reported by Shahid et al [9], when using natural lake water samples. The collisions between the transient hot layers surrounding rising bubbles and the hot bubbles themselves with the coliforms was assumed to be the fundamental mechanism for coliform inactivation in their work [8]. This was also assumed for the fundamental coliform inactivation mechanism in the present work when using the hot gases $N_2$, Ar, and air. However, as shown by the results reported herein, when using $CO_2$ or combustion gas, this is not the only coliform inactivation mechanism.

Bubbling over a 10 min period, the *E. coli* survival factors for air, oxygen, nitrogen, $CO_2$ and argon having an inlet temperature of 150° C., combustion gas having an inlet temperature of 58° C. and oxygen and air having an inlet temperature of 20° C., were compared and the results are shown in FIG. 6. At 150° C., air and nitrogen presented very similar *E. coli* inactivation rates after 10 min of treatment with 1.43 and 1.74—log reduction, respectively. No inactivation was detected with air at 20° C. with only 0.03 log reduction. Argon presented lower inactivation rates with just 0.40 log reduction after 10 minutes, probably due to its low heat capacity, only 0.52 kJ/kgK, which is half of the heat capacity of nitrogen and air (Table 1). For these 3 gases, when the hot gas bubbles form on the surface of the sinter a thin layer of heated water is formed around the surface of the bubbles and this thin layer will have a similar average temperature, with values from 69.3° C. to 72.4° C. (Table 1). *E. coli* is rapidly inactivated at temperatures above 60° C. [29], so hot gas bubbles will effectively inactivate *E. coli* if the temperature of the hot layer around the bubbles is greater than 60° C., hence when bubbling air at 20° C. no *E. coli* inactivation was observed (0.03 log reduction), which supports the thermal collision hypothesis and establishes a base line.

$CO_2$ Inactivation Mechanism

With $CO_2$ (100% of $CO_2$) and combustion gas (with a 12.5 to 14% of $CO_2$ according to the text book 'Combustion Fundamentals' Chapter 2 [41]) at 150° C. and 58° C., respectively, the collision between *E. coli* and the hot $CO_2$ bubbles appears to be not the only mechanism that explains the higher inactivation rates, of 2.63 log for combustion gas and 2.84 log for pure $CO_2$, after 10 minutes (see FIG. 6).

Different mechanisms have been suggested to explain the antibacterial effect of dissolved $CO_2$. In Chapter 4 of the book 'Dense Phase Carbon Dioxide' [38] Osman describes, in great detail, different steps of the bacterial inactivation mechanism for pressurized $CO_2$. When pressurized $CO_2$ first dissolves into the solution its pH decreases. This acidification of the solution increases the penetration of $CO_2$ through the cell membranes. The $CO_2$ inside of the cell will then produce an intracellular pH decrease that will exceed the cell's buffering capacity, resulting in cell inactivation [38, 39]. However, it is also possible that bicarbonate ions bind to lipid headgroups, changing their hydration and head group curvature, pore structure and therefore viability.

When using combustion gases other combustion products than $CO_2$, $H_2O$ and $N_2$ could be present due to minor components and impurities in the fuel and different fuel/air ratio. These gases are typically: carbon monoxide (CO), hydrogen ($H_2$), sulphur oxide ($SO_2$) and mono-nitrogen oxides (NOx) like NO and $NO_2$ [41]. The presence of these gases in very small amounts could also contribute to the inactivation of the bacteria.

Oxidation/Combustion Mechanism

Hot oxygen bubbles at 150° C. in the BCE with 0.17 M NaCl solution containing *E. coli* produced the best inactivation results, with 2.90 log reduction after just 3.5 minutes (FIG. 6). Pure hot oxygen could oxidize and combust the *E. coli* by direct contact or through reactive oxygen species produced at 150° C. It is known that the oxidative properties of $H_2O_2$ can inactivate E. coli, and this inactivation effect increases with the concentration of $H_2O_2$ [43]. Proteins, lipids and nucleic acids can also be oxidised by active oxygen species from incomplete reduction of $O_2$ during respiration [44]. E. coli presents straight cylindrical rod shape of 1.1-1.5 μm diameter and 2.0-6.0 μm length [24]. Compared with the size of the bubbles 1-3 mm, and so these cells could easily penetrate through the thin heated water layer around the oxygen bubbles (Table 1) and directly contact the hot oxygen.

By comparison, the results obtained for E. coli using hot oxygen (at 150° C.) as inlet gas were found to be much more effective than for the MS2 virus (with an inlet temperature of 200° C.), which has a much smaller hydrodynamic radius of about 13 nm [22]. Thus, the low solubility of oxygen in water (Table 1), the inactivation times of viruses (37 min) compared with E. coli (10 min) and the 0.65 log E. coli reduction when using oxygen at 150° C. inlet gas temperature (FIG. 6), supports the hypothesis of the oxidation/combustion of E. coli through direct contact with the gas phase, which is unlikely to occur with the much smaller viruses.

5. Comparison of the Thermal Inactivation Mechanisms for E. coli and Viruses

The World Health Organisation (WHO) in their guidelines for drinking-water quality [40] compared thermal inactivation rates for different types of bacteria and viruses in hot liquids. They concluded that temperatures above 60° C. effectively inactivate both viruses and bacteria. When the temperature range lies between 60° C. and 65° C., bacterial inactivation occurs faster than viral inactivation. These studies showed that at 60° C. water temperature, E. coli needs 300 seconds to reach a 1.5 log reduction compared with 1800 seconds for viruses like enterovirus, echovirus 6, coxsackievirus B4, coxsackievirus B5 to reach 4 log reduction [40].

In our experiments E. coli reached 1.5 log inactivation within 10 minutes (FIG. 6) when bubbling nitrogen or air at 150° C. (where the solution temperature at 10 mins was 43° C. for nitrogen and 45° C. for air) and MS2 virus reached 1 to 1.5 log inactivation after approximately 15 to 37 min with air, oxygen or nitrogen at 200° C. (solution temperature at 37.5 mins was 52° C. for air, 50° C. for oxygen and 54° C. for nitrogen) (FIG. 5). However, E. coli reached 2.6 log inactivation within 10 minutes (FIG. 6) when bubbling $CO_2$ at 150° C. or combustion gas at 58° C. (where the solution temperature at 10 mins was 43° C. for $CO_2$ and 40° C. for combustion gas) and MS2 virus reached 2.0 log inactivation within 5 min with $CO_2$ at 200° C. or combustion gas at 60° C. (solution temperature at 4 mins was 47° C. for $CO_2$ and 30° C. for combustion gas) (FIG. 5). It is proposed that in this process using gases having an inlet temperature in excess of about 100° C., viruses and bacteria are inactivated when they collide with the heated gas bubbles, either with the hot water layer around the hot bubbles or the hot gas within the bubbles. These results agree with the WHO data concerning a faster bacterial inactivation than for viruses, at similar water temperature. However, this phenomena was considerably and surprisingly enhanced when using a BCE with a gas comprising at least 10% $CO_2$ by volume.

6. Effect of $CO_2$ Bubble Temperatures on Virus Inactivation

Figure 7:
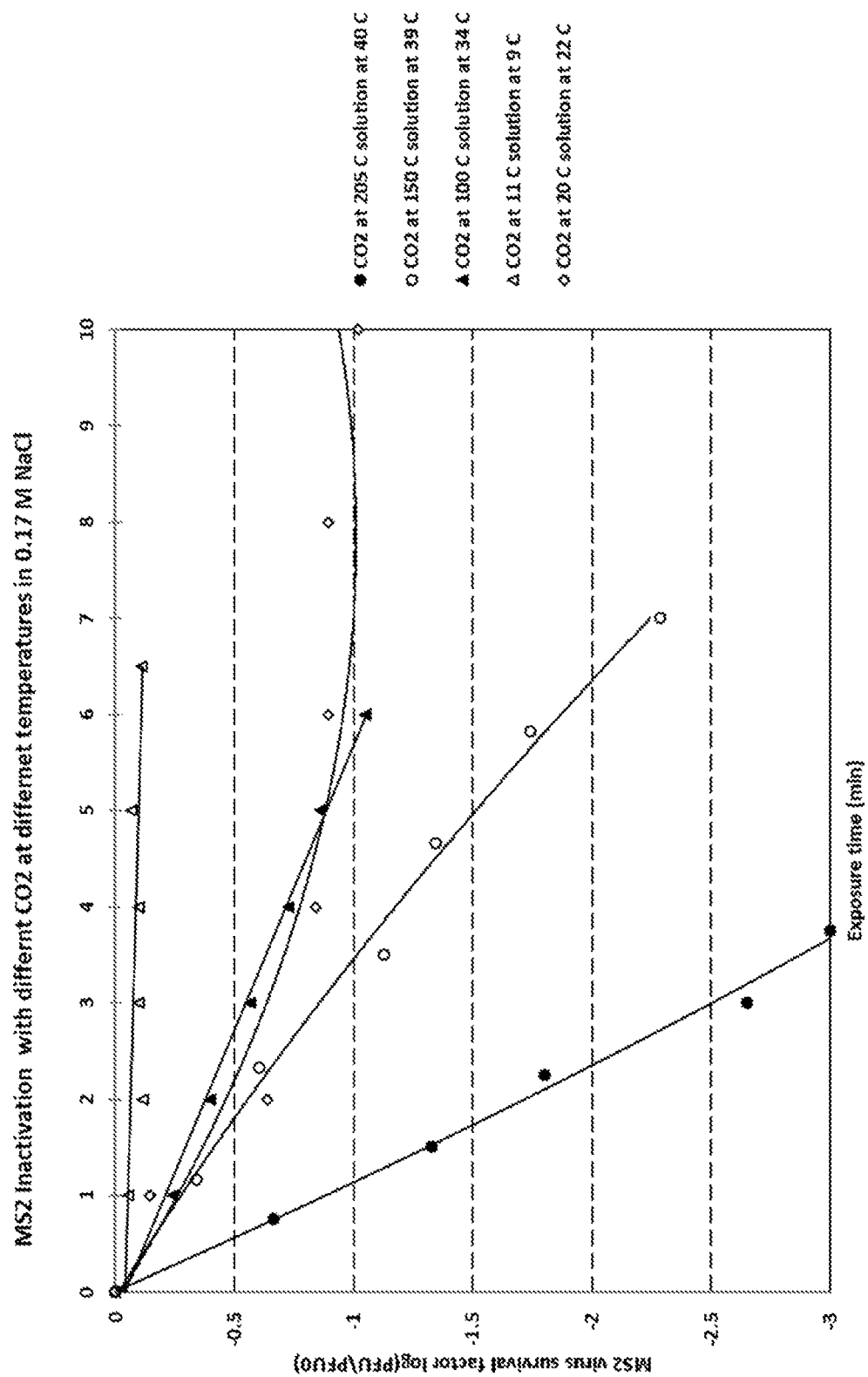
FIG. 7 is a graph of MS2 virus survival factor log (PFU\PFU0) versus exposure time (min) of bubbling carbon dioxide at different $CO_2$ inlet temperatures (205° C., 150° C., 100° C., 11° C. and 20° C.) in a 0.17 M NaCl solution.

Further experiments were conducted using the apparatus depicted in FIG. 1, using $CO_2$ gas having an inlet temperature of 205° C., 150° C., 100° C., 11° C. or 20° C. The results are shown in FIG. 7. The aqueous solution had a temperature of about room temperature (about 22° C.) at the commencement of the process, and the solution temperature reported in FIG. 7 is the temperature at the conclusion of the experiment using the relevant gas (e.g. after 6 minutes for the $CO_2$ having an inlet temperature of 100° C. the bulk temperature of the aqueous solution was 34° C.).

For a gas having an inlet temperature of 100° C. or more, when the hot bubbles form on the surface of the sinter, a thin layer of heated water is formed around the surface of the bubbles. The thickness and the temperature of this thin, transient layer are likely to be important parameters in virus inactivation. Without wishing to be bound by theory, the it is believed the collisions between these hot bubbles and coliforms is able to inactivate coliforms. It is further believed that a similar mechanism is effective to inactive viruses, when the viruses get close enough, within the hot water layer, to the surface of the bubbles.

Figure 8:
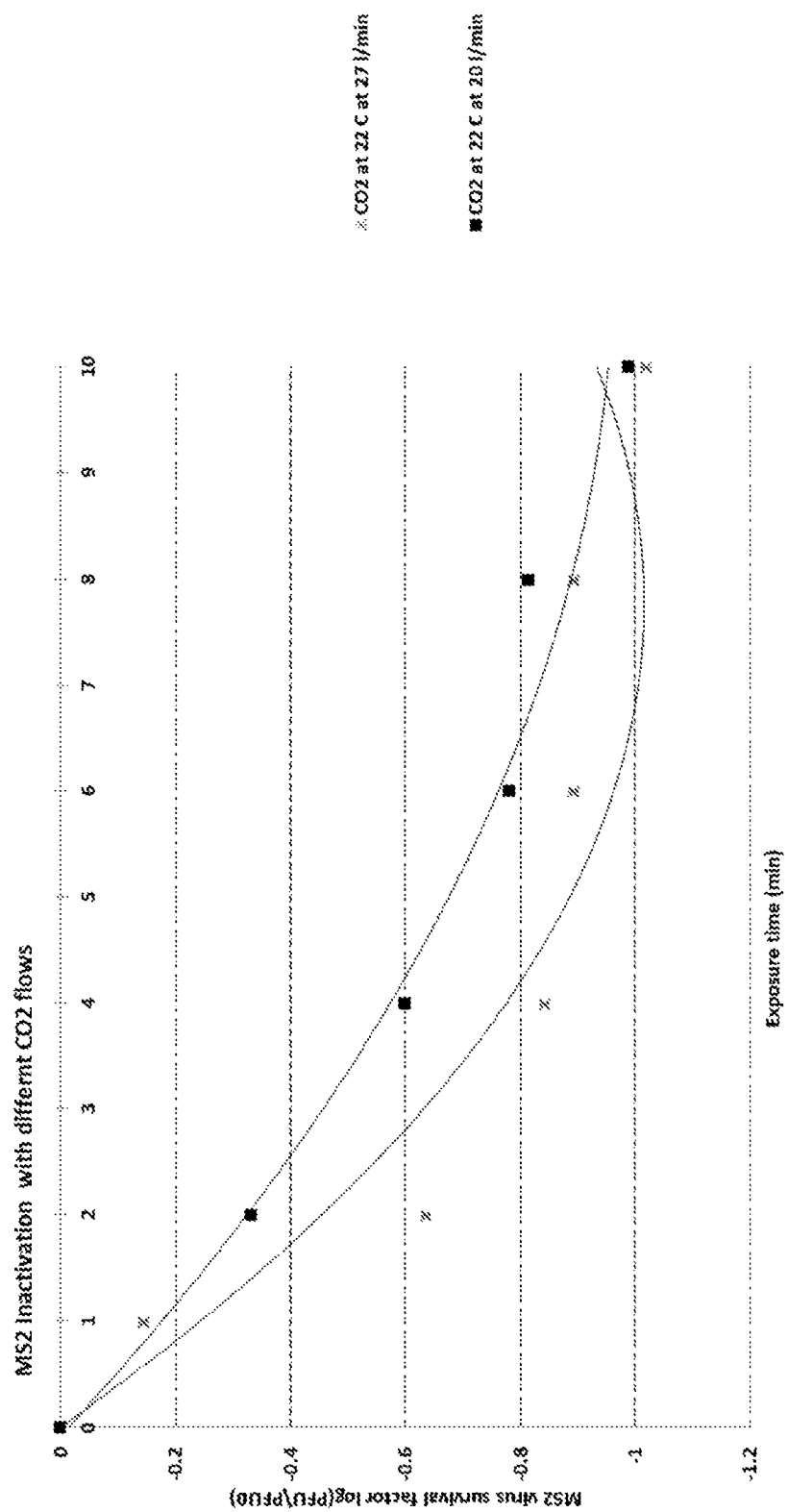
FIG. 8 is a graph of MS2 virus survival factor log (PFU\PFU0) versus exposure time (min) of bubbling carbon dioxide having an inlet temperature of 22° C. at flow rates of 27 l/min or 20 l/min in a 0.17 M NaCl solution.

When $CO_2$ bubbles at room temperature are produced, 1 log virus reduction is achieved in just 10 min (FIGS. 7 and 8). At higher inlet gas temperatures, virus inactivation also increases with 2.3 log-reduction after 7 min. at 150° C. inlet $CO_2$ temperature and 3 log-reduction at 200° C. after 3 min (FIG. 7).

Isenschmid et al., 1995 [45] believe that at solution temperatures over 18° C. the concentration of dissolved, compressed $CO_2$ is the key parameter behind cell death. This could explain why no $CO_2$ inactivation effect was appreciable, with only 0.1 log-reduction, after 6.5 minutes at 9° C. $CO_2$ column temperature, with 11° C. inlet temperature (FIG. 7). If the solution temperature rises over 18° C., either in a layer around the bubbles or in the bulk temperature of the solution, the penetration of the $CO_2$ through the capsid increases with the consequent $CO_2$ effect on MS2 virus inactivation. At $CO_2$ gas inlet temperatures over about 100° C., virus inactivation is apparently caused by the combination of this $CO_2$ inactivation effect and the thermal effects of virus collisions with the hot bubbles.

7. Effect of Gas Flow-Rate in Virus Inactivation When Using $CO_2$

FIG. 8 compares the effect on virus inactivation when using 2 different $CO_2$ flow-rates at 22° C. during 10 min runs. It is clear from these results that although at first 27 l/min of $CO_2$ gas inactivated viruses more effectively than when using 20 l/min, almost doubling the rate after 2 minutes with 0.35 log-reduction and 0.62 log-reduction, as the time approached 10 mins, both inactivation rates became almost identical, at about 1 log reduction.

CONCLUSIONS

Bubbling gases comprising at least 10% $CO_2$ by volume through an aqueous liquid, at atmospheric pressure, can be used to effectively inactivate typical waterborne pathogens (including viruses and bacteria), seemingly through two different mechanisms that depend on the temperature of the inlet gas.

A thermal inactivation mechanism is based on heat transfer between hot gas bubbles and pathogens during collisions. This mechanism is believed to be effective when the gas has a temperature in excess of about 100° C.

With gases comprising at least 10% $CO_2$ by volume, a second inactivation mechanism appears take effect, said mechanism appearing to be based on the penetration of $CO_2$ molecules through bacterial membranes and virus capsids. Bubbling a gas comprising at least 10% $CO_2$ by volume produces a high density of $CO_2$ gas at atmospheric pressure that can be effectively used to inactivate viruses and bacteria in water, where other gases like air, nitrogen and argon produce only a limited inactivation effect. Reduction in pH due to $CO_2$ bubbling was found not to be responsible for the high virus and bacterial inactivation effects obtained using $CO_2$ bubbling. It appears likely that passing bubbles of a gas comprising at least 10% $CO_2$ by volume through the aqueous solution produces high liquid-gas interfacial area and with the high $CO_2$ solubility in water, this plays an important role in virus and bacteria inactivation. This mechanism is effective when the gas has a temperature of 18° C. or higher.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

REFERENCES

1. Kantarci N, Borak F, Ulgen K O: Bubble column reactors. *Process Biochemistry* 2005, 40(7):2263-2283.
2. Shah Y T, Kelkar B G, Godbole S P, Deckwer W D: Design parameters estimations for bubble column reactors. *AIChE Journal* 1982, 28(3):353-379.
3. Degaleesan S, Dudukovic M, Pan Y: Experimental study of gas-induced liquid-flow structures in bubble columns. *AIChE Journal* 2001, 47(9):1913-1931.
4. Craig V S J, Ninham B W, Pashley R M: Effect of electrolytes on bubble coalescence. *Nature* 1993, 364 (6435):317-319.
5. Shahid M, Pashley R M, Mohklesur R A F M: Use of a high density, low temperature, bubble column for thermally efficient water sterilization. *Desalination and Water Treatment* 2013, 52(22-24):4444-4452.
6. Deckwer W D: On the mechanism of heat transfer in bubble column reactors. *Chemical Engineering Science* 1980, 35(6):1341-1346.
7. Garrido A, Pashley R M, Ninham B W: Low temperature MS2 (ATCC15597-B1) virus inactivation using a hot bubble column evaporator (HBCE). *Colloids Surf B Biointerfaces* 2016, 151:1-10.
8. Xue X, Pashley R M: A study of low temperature inactivation of fecal coliforms in electrolyte solutions using hot air bubbles. *Desalination and Water Treatment* 2015:1-11.
9. Shahid M: A study of the bubble column evaporator method for improved sterilization. *Journal of Water Process Engineering* 2015, 8:e1-e6.
10. Pierandrea Lo N, Barry W N, Antonella Lo N, Giovanna P, Laura F, Piero B: Specific ion effects on the growth rates of *Staphylococcus aureus* and *Pseudomonas aeruginosa*. *Physical Biology* 2005, 2(1):1.
11. ATCC: Product Sheet *Escherichia coli* (ATCC 15597). In. Edited by ATCC; 2015.
12. Hryniszyn A, Skonieczna M, Wiszniowski J: Methods for Detection of Viruses in Water and Wastewater. *Advances in Microbiology* 2013, 03(05):442-449.
13. WHO-Geneva C, World Health Organization: Evaluating household water treatment options: Heath-based targets and microbiological performance specifications. Geneva, Switzerland; 2011.
14. Cheng X, Imai T, Teeka J, Hirose M, Higuchi T, Sekine M: Inactivation of bacteriophages by high levels of dissolved $CO_2$. *Environ Technol* 2013, 34(1-4):539-544.
15. Garcia-Gonzalez L, Geeraerd A H, Spilimbergo S, Elst K, Van Ginneken L, Debevere J, Van Impe J F, Devlieghere F: High pressure carbon dioxide inactivation of microorganisms in foods: the past, the present and the future. *Int J Food Microbiol* 2007, 117(1):1-28.
16. Vo H T, Imai T, Ho T T, Sekine M, Kanno A, Higuchi T, Yamamoto K, Yamamoto H: Inactivation effect of pressurized carbon dioxide on bacteriophage Qβ and ΦX174 as a novel disinfectant for water treatment. *Journal of Environmental Sciences* 2014, 26(6):1301-1306.
17. Enomoto A, Nakamura K, Nagai K, Hashimoto T, Hakoda M: Inactivation of Food Microorganisms by High-pressure Carbon Dioxide Treatment with or without Explosive Decompression. *Bioscience, Biotechnology, and Biochemistry* 1997, 61(7):1133-1137.
18. Lucas M S, Peres J A, Li Puma G: Treatment of winery wastewater by ozone-based advanced oxidation processes (O3, O3/UV and O3/UV/H2O2) in a pilot-scale bubble column reactor and process economics. *Separation and Purification Technology* 2010, 72(3):235-241.
19. Raffellini S, Guerrero S, Alzamora S M: EFFECT OF HYDROGEN PEROXIDE CONCENTRATION AND pH ON INACTIVATION KINETICS OF *ESCHERICHIA COLI*. *Journal of Food Safety* 2008, 28(4):514-533.
20. Agranovski I E, Safatov A S, Borodulin A I, Pyankov O V, Petrishchenko V A, Sergeev A N, Agafonov A P, Ignatiev G M, Sergeev A A, Agranovski V: Inactivation of viruses in bubbling processes utilized for personal bioaerosol monitoring. *Appl Environ Microbiol* 2004, 70(12):6963-6967.
21. Seo K, Lee, J. E., Lim, M. Y., Ko, G.: Effect of temperature, pH, and NaCl on the inactivation kinetics of murine norovirus. *J Food Prot* 2012, 75(3):533-540.
22. Valegard K, Liljas L, Fridborg K, Unge T: The three-dimensional structure of the bacterial virus MS2. *Nature* 1990, 345(6270):36-41.
23. Cormier J, Janes M: A double layer plaque assay using spread plate technique for enumeration of bacteriophage MS2. *J Virol Methods* 2014, 196:86-92.
24. Scheutz F, Strockbine N A: *Escherichia*. In: *Bergey's Manual of Systematics of Archaea and Bacteria*. John Wiley & Sons, Ltd; 2015.
25. Welch R A: The Genus *Escherichia*. In: *The Prokaryotes: Volume* 6: *Proteobacteria: Gamma Subclass*. Edited by Dworkin M, Falkow S, Rosenberg E, Schleifer K-H, Stackebrandt E. New York, N.Y.: Springer New York; 2006: 60-71.
26. Yang X: Introduction. In: *A Study on Antimicrobial Effects of Nanosilver for Drinking Water Disinfection*. Singapore: Springer Singapore; 2017: 1-12.
27. Gaska I, Bilenko O, Smetona S, Bilenko Y, Gaska R, Shur M: Deep UV LEDs for Public Health Applications. *International Journal of High Speed Electronics and Systems* 2014, 23(03n04):1450018.
28. ATCC: Product Information Sheet for ATCC 15597-B1. In. Edited by (ATCC) ATCC: ATCC; 2005: 2.
29. Spinks A T, Dunstan R H, Harrison T, Coombes P, Kuczera G: Thermal inactivation of water-borne pathogenic and indicator bacteria at sub-boiling temperatures. *Water Research* 2006, 40(6):1326-1332.

30. McGuigan, Joyce, Conroy, Gillespie, Elmore M: Solar disinfection of drinking water contained in transparent plastic bottles: characterizing the bacterial inactivation process. *Journal of Applied Microbiology* 1998, 84(6): 1138-1148.
31. 10705-1 I: Water quality—Detection and enumeration of bacteriphages—Part 1. In: *ISO* 10705-1. ISO: International Organization for Standardization; 1995.
32. Tabor R F, Chan D Y, Grieser F, Dagastine R R: Anomalous stability of carbon dioxide in pH-controlled bubble coalescence. *Angew Chem Int Ed Engl* 2011, 50(15):3454-3456.
33. Furiga A, Pierre G, Glories M, Aimar P, Rogues C, Causserand C, Berge M: Effects of ionic strength on bacteriophage MS2 behavior and their implications for the assessment of virus retention by ultrafiltration membranes. *Appl Environ Microbiol* 2011, 77(1):229-236.
34. Clokie M R J, Kropinski A M: Enumeration of Bacteriophages by Double Agar Overlay Plaque Assay. In: *Bacteriophages*. Edited by Leicester Uo, vol. 501. Humana Press; 2009.
35. ATCC: Method 1602: Male-specific (F+) and Somatic Coliphage in Water by Single Agar Layer (SAL). In. Edited by Water. USEPAOo; 2001: 30.
36. Agency USEP: Preparing and Assaying Challenge Microorganismos. In.; 2006: 267-277.
37. Knoche W: Chemical Reactions of CO2 in Water. In: *Biophysics and Physiology of Carbon Dioxide: Symposium Held at the University of Regensburg (FRG) Apr. 17-20, 1979*. Edited by Bauer C, Gros G, Bartels H. Berlin, Heidelberg: Springer Berlin Heidelberg; 1980: 3-11.
38. Erkmen O: Effects of Dense Phase Carbon Dioxide on Vegetative Cells. In: *Dense Phase Carbon Dioxide*. Wiley-Blackwell; 2012: 67-97.
39. Lin H M, Yang Z, Chen L F: Inactivation of *Saccharomyces cerevisiae* by supercritical and subcritical carbon dioxide. *Biotechnology Progress* 1992, 8(5):458-461.
40. WHO-Geneva C, World Health Organization: Guidelines for drinking-water quality. In. Edited by Organization WH, vol. 1; 2007: 38.
41. Richard C. Flagan JHS: Fundamentals of air pollution engineering. Chapter 2 Combustion fundamentals. In., vol. Chapter 2. California Institute of Technology: Prentice-Hall, Inc.: 59-166.
42. Richard F. Berendt E L D, Henry J. Hearn: Virucidal Properties of Light and SO2 I. Effect on Aerosolized Venezuelan Equine Encephalomyelitis Virus *Experimental Biology and Medicine* 1972, 139(1).
43. Imlay J A, Linn S: Bimodal pattern of killing of DNA-repair-defective or anoxically grown *Escherichia coli* by hydrogen peroxide. *Journal of Bacteriology* 1986, 166(2):519-527.
44. Fridovich I: The biology of oxygen radicals. *Science* 1978, 201(4359):875-880.
45. A. Isenschmid IWM, U. von Stockar The influence of pressure and temperature of compressed CO, *Journal of Biotechnology* 1995, 39:229-237.

The invention claimed is:

1. A method for inactivating a microorganism in an aqueous solution, the method comprising:
    passing bubbles of a gas through the aqueous solution, wherein the gas comprises at least 10% $CO_2$ by volume and has a temperature of at least 18° C. when the gas begins to pass through the aqueous solution, wherein the aqueous solution is exposed to a pressure of about 0.9 to 1.5 bar and the bubbles have a diameter of 0.1 mm to 7 mm.

2. The method of claim 1, wherein the microorganism is an algae, a protozoa, a fungi, a spore, a virus, or a bacteria.

3. The method of claim 1, wherein the microorganism is a virus or a bacteria.

4. The method of claim 1, wherein the bubbles are passed through the aqueous solution while the aqueous solution is exposed to atmospheric pressure.

5. The method of claim 1, wherein the gas comprises from 50% to 100% $CO_2$ by volume.

6. The method of claim 1, wherein the gas comprises from 10% to 50% $CO_2$ by volume.

7. The method of claim 1, wherein the gas has a temperature in excess of 100° C.

8. The method of claim 1, wherein the gas has a temperature of from 18° C. to 100° C.

9. The method of claim 1, wherein the bubbles are formed by passing the gas through a porous material in contact with the aqueous solution.

10. The method of claim 1, wherein the gas bubbles occupy from 10% to 60% of the total volume of the combination of the aqueous solution and the bubbles as the bubbles pass through the aqueous solution.

11. The method of claim 1, wherein the aqueous solution has a bulk temperature of from 18° C. to 80° C.

12. The method according to claim 1, wherein the aqueous solution has a bulk temperature of from 18° C. to 55° C., and wherein the gas has a temperature higher than the bulk temperature of the aqueous solution.

* * * * *